(12) United States Patent
Nielsen et al.

(10) Patent No.: US 11,952,832 B2
(45) Date of Patent: Apr. 9, 2024

(54) VACUUM INSULATED GLAZING UNIT HAVING A SEPARATION DISTANCE BETWEEN A SIDE SEAL AND A LOW EMISSIVITY COATING, AND ASSOCIATED METHODS OF MANUFACTURING SAME

(71) Applicant: VKR HOLDING A/S, Hørsholm (DK)

(72) Inventors: Karsten Hansgaard Nielsen, Hørsholm (DK); Simon Johnsen, Hørsholm (DK); Søren Vejling Andersen, Hørsholm (DK); Thibault De Rycke, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 0 days.

(21) Appl. No.: 16/973,520

(22) PCT Filed: Jun. 21, 2019

(86) PCT No.: PCT/EP2019/066426
§ 371 (c)(1),
(2) Date: Dec. 9, 2020

(87) PCT Pub. No.: WO2020/002134
PCT Pub. Date: Jan. 2, 2020

(65) Prior Publication Data
US 2021/0254395 A1 Aug. 19, 2021

(30) Foreign Application Priority Data
Jun. 29, 2018 (DK) .............................. PA201870452

(51) Int. Cl.
*E06B 3/66* (2006.01)
*E06B 3/663* (2006.01)
(Continued)

(52) U.S. Cl.
CPC ........ *E06B 3/6612* (2013.01); *E06B 3/66333* (2013.01); *E06B 3/66357* (2013.01);
(Continued)

(58) Field of Classification Search
CPC .. E06B 3/6612; E06B 3/6715; E06B 3/67334; E06B 3/66357; E06B 3/66333;
(Continued)

(56) References Cited

U.S. PATENT DOCUMENTS 5,124,185 A 6/1992 Kerr
6,365,242 B1 4/2002 Veerasamy
(Continued)

FOREIGN PATENT DOCUMENTS

AT 14327 U1 8/2015
KR 20110083247 A 7/2011
(Continued)

OTHER PUBLICATIONS

Takeda et al, WO2013008724A1—English Translation, 2013, EPO, pp. 1-12 (Year: 2013).*
(Continued)

*Primary Examiner* — Maria V Ewald
*Assistant Examiner* — Ethan Weydemeyer
(74) *Attorney, Agent, or Firm* — CANTOR COLBURN LLP

(57) ABSTRACT

The present disclosure relates to a vacuum insulated glazing unit, to the use thereof and to a method of manufacturing such a unit. The vacuum insulated glazing comprises a first glass pane, having a first interior major surface and a first exterior major surface and a second glass pane having a second interior major surface and second exterior major surface, the glass panes being arranged in parallel with said interior major surfaces facing each other. The VIG unit further comprises a low emissivity coating deposited on at
(Continued)

least the first interior major surface, an edge region in proximity to the edge of the first glass pane, defined as where none or a reduced part of the low emissivity coating is present, and a side seal comprising a glassy seal material arranged at a minimum separation distance ($d1\_min$) from said low emissivity coating, so that an intermediate part of said edge region between said glassy sealing material and said low emissivity coating is not bonded to said glassy sealing material, or a side seal arranged at a minimum separation distance ($d1\_min$) of at least 1.5 mm, such as at least 2 mm, or such as at least 3 mm from said low emissivity coating.

9 Claims, 9 Drawing Sheets

(51) Int. Cl.
*E06B 3/67* (2006.01)
*E06B 3/673* (2006.01)

(52) U.S. Cl.
CPC ........ *E06B 3/6715* (2013.01); *E06B 3/67334* (2013.01); *E06B 2003/66338* (2013.01)

(58) Field of Classification Search
CPC .......... E06B 3003/66338; Y02B 80/22; Y02B 30/249
See application file for complete search history.

(56) References Cited

U.S. PATENT DOCUMENTS

| 2011/0223371 | A1* | 9/2011 | Kawanami | H01G 9/2077 |
| | | | | 428/76 |
| 2016/0031739 | A1* | 2/2016 | Lezzi | C03B 29/16 |
| | | | | 65/157 |
| 2017/0203997 | A1 | 7/2017 | Miyake | |
| 2017/0243995 | A1 | 8/2017 | Godeke | |

FOREIGN PATENT DOCUMENTS

| WO | 2013008724 A1 | 1/2013 |
| WO | 2014108274 A1 | 7/2014 |
| WO | 2016027750 A1 | 2/2016 |
| WO | 2016123273 A1 | 8/2016 |
| WO | 2016130854 A1 | 8/2016 |
| WO | 2016144857 A1 | 9/2016 |
| WO | 2017043054 A1 | 3/2017 |

OTHER PUBLICATIONS

International Search Report for corresponding application PCT/EP2019/066426 filed Jun. 21, 2019; dated Sep. 30, 2019.

* cited by examiner

Table 1

| | A1 | σA1 | A2 | σA2 | A3 | σA3 |
|---|---|---|---|---|---|---|
| 1 | 0.034 | 0.010 | 0.033 | 0.005 | 0.032 | 0.004 |
| 2 | 0.034 | 0.002 | 0.032 | 0.003 | 0.030 | 0.002 |

Table 2

| | B1 | σB1 | B2 | σB2 | B3 | σB3 |
|---|---|---|---|---|---|---|
| 1 | 0.030 | 0.016 | 0.037 | 0.006 | 0.030 | 0.003 |
| 2 | 0.050 | 0.003 | 0.042 | 0.009 | 0.043 | 0.004 |

Table 3

| Ω/sq | P1 | P2 | P3 | P4 | P5 |
|---|---|---|---|---|---|
| 1 | 2.406 | 2.290 | 2.274 | 2.567 | 2.362 |
| 2 | 2.946 | 2.665 | 3.288 | 2.987 | 2.609 |
| Δ | 0.540 | 0.375 | 1.014 | 0.420 | 0.247 |

VACUUM INSULATED GLAZING UNIT HAVING A SEPARATION DISTANCE BETWEEN A SIDE SEAL AND A LOW EMISSIVITY COATING, AND ASSOCIATED METHODS OF MANUFACTURING SAME

The present disclosure relates to a vacuum insulated glazing (VIG) unit with a separation distance between the side seal of the VIG unit and a low emissivity coating deposited on one or more glass pane surfaces of the VIG unit. The present disclosure also relates to a window comprising such VIG unit and a window frame. The present disclosure further relates to a method of manufacturing such a VIG unit as well as to the use thereof.

BACKGROUND

Vacuum insulated glazing (VIG) units generally comprises a cavity of low pressure acting as an insulating barrier, where the cavity is enclosed by two aligned glass panes sealed at the edges thereof by a side seal. In vacuum insulated glazing (VIG) units one or both of the glass panes of the VIG unit may additionally be coated with a low emissivity coating, usually on the inner surface of the glass pane facing the cavity. Such low emissivity coating has the ability to modulate the insulation properties of the VIG unit by transmitting and reflecting selected wavelengths of electromagnetic radiation. The low emissivity coatings typically comprises a single or a stack of different coating layers, each coating layer is carefully selected based on their optical properties such that the low emissivity stack reflects and transmits specific parts of the visible and infrared spectrum. Low emissivity coatings may be deposited on the glass surface using a variety of different soft and hard coat deposition methods such as pyrolytic or sputtering methods.

It is a continuous desire within the field to provide VIG units of higher quality and lifetime, especially VIG units that are capable of maintaining a low pressure value within the cavity over a long time period. The pressure level within the cavity is highly dependent on the efficiency of the side seal, and many previous studies have therefore focused on optimization of the side seal. As an example, it has been discovered, that some low emissivity coatings have low adhesion efficiency to the glass surface compared to the adhesion efficiency of many typical side seal materials to the glass surface, such as seal materials comprising glass solder and metal solder. As a possible solution, low emissivity coatings are removed from the glass surface in a contact area corresponding to the area of the glass surface, which is to be bonded to the side seal material, so as to avoid a collapse of adhesion efficiency of the side seal. Patent document no. KR 20110083247 describes an example of such elimination of the low emissivity coating.

It is an object of the present disclosure to provide a method of manufacturing a VIG unit, which result in a high yield and reduced scrap rate. It is a further object to provide a VIG unit of increased lifetime and reduced occurrence of premature degradation.

BRIEF DESCRIPTION OF THE INVENTION

During production and lifetime of the VIG unit, the VIG unit may experience a wide range of temperatures, some which may be quite high e.g. to clean the unit or to form the seals. The high temperature, for example 200-500° C., can affect the structure and content of the side seal. The side seal may outgas species to the interior cavity, and to the vicinity of the low emissivity coating. The inventors has discovered indications of an undesirable interaction between the low emissivity coating and the side seal material, even when these two elements are not in direct physical contact with each other. Specifically, it has been observed that upon heating the VIG unit, a structural and/or aesthetic change in low emissivity coating in a region adjacent to the sealing material may occur. Such change in the low emissivity coating have shown to have a negative impact on the quality and lifetime of the VIG unit, e.g. a change in low emissivity coating can cause obstruction of the visibility through the viewing area of the VIG unit, peeling of the low emissivity coating as well as outgassing of the species into the cavity from the low emissivity coating. Furthermore, a direct physical contact between low emissivity coatings and the side seal may introduce micro cracks in the seal, which may slowly increase the pressure in the VIG unit. Moreover, air leaking into the VIG unit can cause other undesirable effects such as fogging or condensation. As a solution to the above challenges, the inventor has found that in order to prevent any premature degradation of VIG unit a minimum separation distance or a barrier layer, or both, is provided between the side seal and the low emissivity coating.

The first aspect of the present disclosure relates to a vacuum insulated glazing (VIG) unit comprising
- a first glass pane, having a first interior major surface and a first exterior major surface and a second glass pane having a second interior major surface and second exterior major surface, the glass panes being arranged in parallel with said interior major surfaces facing each other, the VIG unit further comprises
- a low emissivity coating deposited on at least the first interior major surface,
- a side seal arranged at a minimum separation distance ($d1\_min$) of at least 1.5 mm, such as at least 2 mm, or such as at least 3 mm from said low emissivity coating.

The provided minimum separation distance ($d1\_min$) ensures a protection of the low emissivity coating from interacting with any outgassed species from the side seal, which may in turn reduce the integrity of the low emissivity coating in the damaged area thereby create loss of low emissivity, introduce outgassing that increases the pressure within the VIG unit and introduce changes to the U-value. Surprisingly, the inventor has found indications that the problem of disadvantageous interaction of species of the low emissivity coating and the side seal can be significantly reduced or even prevented by separating the side seal and the low emissivity coating by a small distance. Any further treatments of the low emissivity coating or the side seal may thereby be avoided in order to solve the problem.

In one or more embodiments according to the first aspect, the vacuum insulated glazing unit comprises an edge region in proximity to the edge of the first glass pane, defined as where none or a reduced part of the low emissivity coating is present. Surprisingly, the inventor has found indications that the problem of disadvantageous interaction of species of the material of the low emissivity coating and the side seal can be significantly reduced or even prevented by providing an edge region, having a reduced thickness of the low emissivity coating, where the thickness is measured perpendicular to the interior major surface. In one or more embodiments, the reduced thickness of the low emissivity coating may correspond to a near complete removal of the low emissivity coating.

The second aspect of the disclosure relates to a vacuum insulated glazing (VIG) unit comprising
- a first glass pane, having a first interior major surface and a first exterior major surface and a second glass pane having a second interior major surface and second exterior major surface, the glass panes being arranged in parallel with said interior major surfaces facing each other, the VIG unit further comprises
- a low emissivity coating deposited on at least the first interior major surface,
- an edge region in proximity to the edge of the first glass pane, defined as where none or a reduced part of the low emissivity coating is present,
- a side seal comprising a glassy seal material, wherein the side seal is arranged at a minimum separation distance ($d1\_min$) from said low emissivity coating, so that an intermediate part of said edge region between said side seal and said low emissivity coating is not bonded to said side seal.

By the present VIG unit, a separation of the glassy seal material and the low emissivity coating is ensured so as to significantly reduce any possible chemical attack on the low emissivity coating by species originating from the glassy seal material especially during formation of the side seal and further reduce the possibility of producing outgassing from the coating. The minimum separation distance ($d1\_min$) is of a size allowing the intermediate part of the edge region to be exposed, ensuring a protective distance between the glassy seal material and the low emissivity coating. The intermediate edge region may extend around the entire peripheral edge.

In one or more embodiments according to the second aspect, the VIG unit further comprises a low-emissivity coating deposited on the second interior major surface of the second glass pane, and a second edge region in proximity to the edge of the second glass pane, defined as where none or a reduced part of the low emissivity coating is present, and
  wherein said side seal is arranged at a minimum separation distance ($d1\_min$) from both low emissivity coatings, so that intermediate parts of the edge regions between said side seal and said low emissivity coatings are not bonded to said side seal.

In one or more embodiments, the intermediate edge region on a glass pane extends from the interface between the edge region and the low emissivity coating, to the adjacent boundary of the contact interface between the glassy seal material and edge region. In one or more embodiments, the intermediate edge region may be exposed to the cavity.

In one or more embodiments according to the second aspect, the side seal is arranged at a minimum separation distance ($d1\_min$) of at least 1 mm, such as at least 1.5 mm, such as at least 2 mm, or such as at least 3 mm from said low emissivity coating.

The third aspect of the disclosure relates to a vacuum insulated glazing (VIG) unit comprising
- a first glass pane, having a first interior major surface and a first exterior major surface and a second glass pane having a second interior major surface and second exterior major surface, the glass panes being arranged in parallel with said interior major surfaces facing each other, the VIG unit further comprises
- a low emissivity coating deposited on at least the first interior major surface,
- a side seal,
- a side surface of said low emissivity coating,
- a barrier material arranged to cover at least a part of the side surface of the low emissivity coating so as to separate said part of the side surface from said side seal by a minimum buffer distance ($d2\_min$).

By the present VIG unit, a separation by the barrier material of the seal material and the low emissivity coating is ensured so as to significantly reduce any possible chemical attack and further possible outgassing. The minimum barrier distance ($d2\_min$) may be provided in all points within the VIG unit, such that there exist no weak points at which a leak may be developed.

In one or more embodiments, the vacuum insulated glazing unit comprises an edge region in proximity to the edge of the first glass pane, defined as where none or a reduced part of the low emissivity coating is present, and wherein said side seal is arranged on a portion of the edge region.

Surprisingly, the inventor has found indications that the problem of disadvantageous interaction of species of the side seal, especially during formation of the side seal and the low emissivity coating material can be significantly reduced or even prevented by providing an edge region, having a reduced thickness of the low emissivity coating, where the thickness is measured perpendicular to the interior major surface.

In one or more embodiments of the third aspect, the VIG unit further comprises
- a low emissivity coating deposited on the second interior major surface of the second glass pane, wherein the low emissivity coating comprises a side surface,
- an edge region in proximity to the edge of the second glass pane, defined as where none or a reduced part of the low emissivity coating is present,
- a barrier material arranged to cover at least a part of the side surface of the low emissivity coating so as to separate said part of the side surface from said side seal by a minimum buffer distance ($d2\_min$).

In one or more embodiments, the size of the minimum buffer distance ($d2\_min$) provided on the first and second glass panes may be different or similar. In one or more embodiments, the glass panes may be approximately the same or at least manufactured by the same process prior to being paired. In one or more embodiments, the width of the of the edge region of the first glass pane may be substantially equal or different to the width of the edge region of the second glass pane. In one or more embodiments, the width of the edge region may be measured to the boundary of the complete low emissivity coating e.g. at the side surface of the low emissivity coating. The width may be measured along the interior major surface, perpendicular to the edge of the pane.

In one or more embodiments of the third aspect, said barrier material is arranged between said low emissivity coating, e.g. at least a part of said side surface, and the side seal.

In one or more embodiments of the third aspect, the side surface of said low emissivity coating is defined as extending along the edge of low emissivity coating, from the interface between the glass pane and the low emissivity coating to the top surface of the low emissivity coating. As a result, the side surface may comprise side sections of underlying parts, such as underlying coating layers of the low emissivity, which is otherwise covered by the top surface of the low emissivity coating. The side surface may typically be orientated substantially perpendicular relative to the major surface of the first glass pane, but may be of other orientation depending on deposition or deletion methods.

At least a part, or all of the side surface, may comprise coating materials of the coating layers which are sensitive to chemical attack from outgassed species form the side seal material. The side seal material may comprise enclosed species, such as pollutants, solvents or binders that released upon VIG manufacture or during the lifetime of the VIG, which outgassed species can interact with the low emissivity coating. In order to avoid any deterioration of the low emissivity coating at least a part of the side surface is covered with a barrier material. The barrier material may be deposited using any suitable depositing methods.

Providing the VIG unit with a barrier material may allow the side seal to be arranged closer to the low emissivity coating. Even with the barrier material present there may exist no direct physical contact between the side seal and the low emissivity coating. The barrier material further significantly reduces or eliminates any outgassing from the coating layers covered.

In one or more embodiments of the third aspect, the side surface comprises a number of side surfaces of coating layers of the low emissivity coating and the barrier material is arranged to cover all or one or more of these side surfaces of the coating layers. The barrier material may be arranged to only cover parts of the low emissivity coating, which are particularly chemically sensitive to an acidy or alkaline environment. Alternatively or additionally, the barrier material may also cover a part of the upper surface of the low emissivity coating. Additionally or alternatively, the barrier material may provide a minimum distance between the side seal material and the low emissivity coating, measured through the cavity and not through the barrier material etc., which is equal or larger than the minimum separation distance ($d1\_min$). The distance measured is a distance available for species to travel between the side seal material and low emissivity coating within the cavity, e.g. during evacuation of the cavity.

In one or more embodiments of the third aspect, the minimum buffer distance ($d2\_min$) corresponds to a width of the barrier material, measured along a line orientated along the shortest distance between the protected and covered side surface or a part of the side surface to be protected (e.g. selected side surfaces of the coating layers) and the side seal.

In one or more embodiments of the third aspect, said minimum buffer distance ($d2\_min$) is at least 0.1 nm, such as at least 50 nm, or such as at least 100 nm, measured from said side surface to said side seal.

The barrier material may be provided in a relatively thin layer compared to the width of the side seal, whereby the side seal can be bonded to a larger area of the edge region or interior surface of the glass panes. In one or more embodiments, the barrier layer may have been provided using methods such as atomic layer deposition methods or self-assembled layer deposition methods, e.g. targeting specific elements.

In one or more embodiments, said minimum buffer distance ($d2\_min$) is measured along the shortest distance from said side surface to said side seal. The buffer distance may be at least 0.1 nanometre, or such as 10 nanometre, or such as 1 microns. The buffer distance may be below 10 nm, such as below 6 mm, such as below 5 mm, such as below 3 mm or such as below 2 mm. In one or more embodiments, the minimum buffer distance ($d2\_min$) may be on the order of nanometres to millimetres, such as between a 1 nm to 6 mm, or such as between 100 nm to 1 mm.

In one or more embodiments of the third aspect, said barrier material is of a barrier width, which is below 6 mm, such as below 5 mm, or such as below 4 mm, measured parallel to the first major surface.

The barrier material may be arranged such that it is of a barrier width, which is less than 10 mm, such as less than 8 mm or such as less than 6 mm as measured along the first major interior surface. In one or more embodiments, the collective width of the side seal and the barrier material in the finished VIG unit is no larger than an overlap width of a window frame, such as no larger than 12 mm, measured parallel to the interior major surface of the glass pane. A sufficiently large part of the edge region may then be available for the side seal to bond to.

In one or more embodiments of the third aspect, said barrier material is bonded to at least a portion of said edge region between said side seal and said side surface of low emissivity coating.

The barrier material may provide a more resilient and durable physical barrier protecting the low emissivity coating by being bonded to abutting surfaces. The barrier material may be bonded to the covered side surfaces. It may be further bonded to a portion of the edge region in the proximity of the side surface and it may further be bonded to the side seal, which also may be bonded to a portion of the edge region. Alternatively or additionally, the barrier material may also be bonded to a part of the upper surface of the low emissivity coating. In one or more embodiments, the barrier material is extending from said side surface to said side seal.

In one or more embodiments, the barrier material may be of any suitable material that can sufficiently adhere to the surfaces to be bonded and which does not undergo outgassing of species during the manufacture and lifetime of the VIG unit. In one or more embodiments, the barrier material may comprise one or more layers of different compositions.

In one or more embodiments of the third aspect, said barrier material comprises an amorphous material, such as silicon dioxide ($SiO_2$) or silicon nitride ($Si_3N_4$).

An amorphous material can provide a less permeable barrier than a crystalline material. A barrier material may mainly comprise a material, which can provide an efficient and durable bond to other glass material parts abutting said barrier material such as to the interior major surface of the glass pane and/or a glassy seal material. In one or more embodiments, the barrier material is of a coefficient of thermal expansion with is similar to the coefficient of thermal expansion of abutting surfaces. In one or more embodiments according to the third aspect, the side seal is arranged at a minimum separation distance ($d1\_min$) of at least 1 mm, such as at least 1.5 mm, such as at least 2 mm, or such as at least 3 mm from said low emissivity coating.

It is generally understood that one or more of the features and/or embodiments described in the following may be combined with any of the first, second or third aspect of the present disclosure described above.

In one or more embodiments of the first second or third aspect, the minimum separation distance ($d1\_min$) may be approximately at least 1.1, such as 1.4 or such as 1.7 mm. The minimum separation distance ($d1\_min$) may be approximately at least 2 mm, such that the side seal is separated from the low emissivity coating by at least 2 mm at any point within the VIG unit. In one or more embodiments, the minimum separation distance ($d1\_min$) may be approximately such that the side seal is separated from the low emissivity coating by at least 2.5, 3.0, 3.5, 4.0, 4.5, 5.0, 5.5 or 6.0 mm at any point within the VIG unit.

In one or more embodiments of the first, second or third aspect, the distance is measured from the boundary of the side seal and to the nearest boundary of the low emissivity coating, such as from the top surface or side surface of the low emissivity coating along a straight line to a boundary of the side seal, e.g. uncovered surface of the side seal.

The minimum separation distance ($d1\_min$) between the side seal and the low emissivity coating may vary if e.g. the thickness of the side seal layer varies. In one or more embodiments according to the first aspect, the minimum separation distance ($d1\_min$) varies over a length of the glass panes, wherein the variation in minimum separation distance ($d1\_min$) is at the most 2 mm, such as at the most 1.5 mm, such as at the most 1.0 mm. By minimum separation distance ($d1\_min$) is therefore meant the minimum distance when considering this variation.

The direction along with the shortest distance may be orientated generally depends on the nature and shape of the side seal and the shape of the low emissivity coating in proximity to one another. The minimum separation distance may therefore be measured along different directions for different arrangements of the side seal and low emissivity coating.

In one or more embodiments of the first, second or third aspect, only parts if the low emissivity coating is sensitive to interaction with species from the side seal and the minimum separation distance ($d1\_min$) is at least ensured between side seal and the nearest sensitive part of the low emissivity coating.

In one or more embodiments of the first second or third aspect, the minimum separation distance is measured from a plane extending a long the low emissivity coating edge and to the side seal.

In one or more embodiments of the first second or third aspect, the rate of heat loss through a window is generally indicated in terms of the U-value, where a low U-value indicates a low rate of heat loss and thereby a window having efficient insulating properties. In order to decrease possible heat loss through the VIG unit from the interior living environment to the outside, the low emissivity coating may be designed to allow for high transmission of white light emission and to reflect a large fraction of infrared radiation incident on the interior side of the pane, thereby reducing heat losses especially beneficial in winter periods. In one or more embodiments of the disclosure, the low emissivity coating of the VIG unit may also provide solar control properties, such that a large fraction of the solar radiant energy is reflected, maintaining the living environment comfortable in summer periods.

In one or more embodiments of the first, second or third aspect, the low emissivity coating may be provided using a pyrolytic process or a sputtering process. A sputtered layer for the low emissivity coating may be provided using one or more of the following deposition methods: physical vapour deposition (PVD), chemical vapour deposition (CVD), magnetron sputtering deposition (MSD), such as in a low pressure environment, such as in a vacuum chamber. The low emissivity coating may comprise a single layer or a multi-layer coating stack. In one or more embodiments, the low emissivity coating layer may be made of a single layer pyrolytic coating, or a multilayer pyrolytic coating. The pyrolytic coating may be made of one or more metallic oxides, e.g. tin oxide. Furthermore the pyrolytic coating layer may additionally comprise one or more adhesion layers, for aiding in the bonding process between the coating layer and the glass surface, while the glass may be in a semi-molten state.

In one or more embodiments of the first second or third aspect, a sputtered coating layer of a low emissivity coating, e.g. provided using physical vapour deposition method, may mainly comprise of metals, metal oxides, and/or metal nitrides or a combination thereof.

In one or more embodiments of the first, second or third aspect, the low emissivity coating has a thickness of 1 to 500 nm, such as 10 to 400 nm, such as 20 to 300 nm, or such as 50 to 250 nm. Such optical coatings may be applied using a suitable film-forming process such as physical or chemical vapor deposition or pyrolytic coating methods.

In one or more embodiments of the first, second or third aspect, a narrow band of coating around the entire perimeter of the glass pane is removed. The low emissivity coating may be removed by mechanical methods, such as physical abrasion or laser removal or chemical methods, e.g. using chemical etching methods, or both.

In one or more embodiments of the first, second or third aspect, the edge region may comprise a region where the interior major surface is exposed, or the edge region may comprise a reduced part of the low emissivity coating such as the lowermost part of the low emissivity coating. The lowermost part may be leftover from an edge deletion process. In one or more embodiments, the edge region may extend to an interface at which the low emissivity coating is intact or complete, such as from the edge of the glass pane to said interface.

In one or more embodiments of the first, second or third aspect, the low emissivity coating comprises an edge arranged towards the edge of the glass pane, wherein the edge comprises a side surface. In one or more embodiments, the side surface of said low emissivity coating is defined as extending along the edge of low emissivity coating, from the interface between the edge region and the low emissivity coating to the top surface of the low emissivity coating. The side surface may expose underlying coating layers of the low emissivity coating to the side seal and allow for interaction with species from the side seal. In one or more embodiments, one or more underlying coating layers of the low emissivity coating are particularly sensitive towards species from the side seal and the minimum separation distance is provided between these layers and the side seal.

In one or more embodiments of the first second or third aspect, the low emissivity coatings include one or two highly reflective layers each sandwiched between two layers of a transparent dielectric film. Increasing the number of reflective layers can increase the total infrared reflection. A change in the integrity of the reflective layer may negatively impact on the coating's durability and/or color.

In one or more embodiments of the first, second or third aspect, the side seal material is provided for joining said first and second glass pane near the edge of said glass panes. The side seal material may be bonded to the edge and/or the interior major surface, or both, of the first glass pane. The side seal material may additionally be bonded to the edge and/or the interior major surface of the second glass pane. In one or more embodiments, the edge of the glass panes extend from the interior major surface to the exterior major surface of the glass panes, where the interior major surface faces the cavity and the opposing glass pane.

In one or more embodiments of the first, second or third aspect, said side seal material is arranged on a portion of the edge region. The side seal may be arranged in direct contact with the edge region, which may comprise a part of the interior surface of the first glass pane or a reduced thickness of the low emissivity coating. In one or more embodiments, said side seal is bonded to a portion of said edge region so that there exist an exposed intermediate edge region, which is un-bonded with the side seal, between the side seal and the low emissivity coating. The intermediate edge region may comprise an exposed part of the surface of the glass pane or comprising a reduced amount of the low emissivity coating. In one or more embodiments, the intermediate edge region may be exposed to the cavity.

In one or more embodiments of the first, second or third aspect, the edge region is created by edge deletion of the entire thickness of the low emissivity coating in the region, which may in some instances further include an edge deletion of one or more surface layers of the interior major surface, either by physical or chemical methods. In one or more embodiments, the edge region of a glass pane is located directly adjacent to the edge of the glass pane.

In one or more embodiments, the side seal may be a glassy seal material, a metal solder material, a metal oxide solder material. The materials may contain species that can be outgassed and interact with the low emissivity coating, e.g. during heating of the VIG unit during manufacturing to temperatures above 200, 250 or 270 degrees Celsius. The coating layers can be sensitive to temperature changes, humidity, radiation and ambient atmosphere, especially ambient atmosphere containing acid medium or alkaline medium and/or pollutants, which may originate from the side seal material.

In one or more embodiments, possible suitable side seals for the VIG unit may include materials such as low melting point solder glass frit, indium, Ostalloy 313-4, 99% indium (In) wire e.g. available from Arconium (Providence, R.I.), or liquid glass (e.g., glass composition with water in it when applied, wherein the water evaporates when heated to form the inner seal portion).

In one or more embodiments of the first, second or third aspect, the side seal is made of a glassy seal material, such as a low melting point glass material.

In one or more embodiments according to the first, second or third aspect, the side seal may be solely made of a glassy seal material or at least a majority of the side seal may be made of a glassy seal material.

In one or more embodiments of the first or second aspect or third aspect, the side seal may be made of a material which can be a soldering material, for example a glassy seal material comprising glass powder or particles such as a low melting point glass frit with a low melting temperature, wherein thermal treatment may hermetically seal the periphery of the VIG unit. The side seal material may initially be in solid, paste or liquid form and providing the side seal during or after the VIG manufacturing process. In one or more embodiments, the side seal material may comprise a low melting point glass solder frit paste with a low melting temperature, where the paste further comprises of a portion of (e.g. about 70 wt %) an organic binder, inorganic fillers, and a solvent. The binders and solvents may be present to make the paste flow and may removed by evaporation during formation of the side seal. The solvent may for example be propylene glycol diacetate ($C_7H_{12}O_4$). In aspects of the disclosure, the glassy sealing material may be a vanadium-tellurium oxide solder glass material, or it may a solder glass material as disclosed in e.g. one or more of the embodiments of e.g. paragraphs [0020] to (and including) [0089] of US 2017/0243995 A1, or a solder glass material as disclosed in one or more of the embodiments of e.g. paragraphs [0071] to (and including)[0074] of US 2017/0203997 A1 and/or a solder glass material as disclosed in one or more of the embodiments of e.g. paragraphs [0013] to (and including) [0046] of WO 2016/123273 A1.

In one or more embodiments, the side seal may be made of a low melting point solder glass frit comprising the following ingredients: tellurium dioxide, divanadium pentaoxide, aluminium oxide in glasses/pigments and manganese dioxide. The concentrations of the ingredient may be 30-50% tellurium dioxide, 20-30% divanadium pentaoxide, 5-10% aluminium oxide in glasses/pigments and 1-5% manganese dioxide. The side seal material used to provide the side seal may initially have been in a paste form and comprising a binder, such as poly(propylene carbonate) and a solvent such as propane-1,2-diyl diacetate.

The thermal expansion coefficient of the glass panes and the side seal may be of a similar thermal expansion coefficient so as to provide a more durable seal. One of the advantages of using the low melting point glass frit, it that it can be provided as having a thermal expansion coefficient similar to the bonded parts, making it a highly attractive sealing material. E.g. the low melting point glass material may be a combination of two different materials comprising glass solder frit with different thermal expansion coefficients that are adjusted to correspond to the thermal expansion coefficients of the bonded parts. In one or more embodiments, upon thermal treatment of the low melting point glass frit, alkaline and/or acidy species from the binders and solvents may be outgassed to the cavity e.g. during sintering of the material, in concentrations where outgassed acidy or alkaline species from the binder and solvent materials to have negative chemically interaction with the low emissivity coating layer. By the present disclosure, a continuous use of low melting point glass frit can be ensured by preventing the negative interaction by ensuring the minimum separation distance (d1_min). Thereby the beneficial sealing properties of the low melting point frit seal can be continuously exploited.

In one or more embodiments of the first, second or third aspect, said glassy seal material comprises at least one metal oxide, such as divanadium oxide.

The metal oxide may be implemented in the sealing material in order to modify certain properties of the glassy seal material such as the coefficient of thermal expansion, softening point and adhesive properties. The coefficient of thermal expansion of the frit materials may be modified to be compatible with the glass pane coefficient of thermal expansion. This has the advantage that the temperature changes have less impact on the integrity of the vacuum insulated glazing (VIG) unit.

In one or more embodiments, the glassy seal material may comprise at least one metal oxide such as divanadium oxide ($Va_2O_5$), bismuth oxide ($Bi_2O_3$), tellurium dioxide ($TeO_2$) or Zinc oxide (ZnO). The frit material may additionally also comprise aluminiumoxide ($Al_2O_3$), Molybdenum trioxide ($MoO_3$) or Tungsten Trioxide ($WO_3$) or a combination thereof.

In one or more embodiments, the low melting point glass frit material includes vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or a combination thereof. Also several solder materials may allow pre-sintering of a first solder to the glass surface and subsequently use of a second solder to join to the first solder.

In one or more embodiments of the first, second or third aspect, said glassy seal material comprises at least one solvent material and at least one binder material.

The solvent and binder material may allow for an easier application of the glassy seal material in which it may be applied as a paste adhering to the surfaces to be bonded. The content, e.g. the solvent and binder amounts, of the glassy seal material can be adjusted depending on e.g. deposition method, substrate material and process temperatures. The binder and/or solvent may also comprise species, which can negatively interact with the low emissivity coating, causing effects such as delamination and corrosion. In one or more embodiments, a majority or all of the low emissivity coating materials are sensitive to such outgassed species from especially the binder material.

In one or more embodiments, the glassy seal material may comprise a binder made of organic material such as propylene carbonate $(C_4H_6O_3)_n$, which has a boiling point and is outgassed from the glassy seal material at temperatures above 200 degrees Celsius. When heated to decomposition it may emits acidy gaseous medium such as smoke or fumes, which can affect the low emissivity coating causing it to change in chemical and physical composition. In one or more embodiments, the seal material may comprise the QPac 40 binder from Empower materials.

The solvents may be added in amount needed to obtain the desired viscosity of the paste. Solvents used may evaporate and outgas from the side seal during the VIG unit manufacturing process. The chosen solvents may evaporate around 100 degrees C. In one or more embodiments, the solvent may include water, acetone, ethyl acetate, or propane-1,2-diyl diacetate.

In one or more embodiments according to the first, second or third aspect, the side seal extends from a portion of said edge region of the first glass pane to said second major interior surface of said second glass pane.

The side seal may only be bonded to a part of the edge region, such as a part of the edge region near the edge of the glass pane arranged with said edge region. The edge region may be exposed on either side of the side seal. In one or more embodiments, the side seal is bonded to the first glass pane and the second glass pane. As an advantage, due to a lower adhesion efficiency of coating layers a more resilient and durable bond may be provided by eliminating any intermediate layers between the side seal and the glass pane(s). In one or more embodiments using a non-glassy seal material, an intermediate seal material in between the non-glassy seal material and the glass panes with a suitable thermal expansion efficiency and adhesion efficiency to the bonded parts, can be provided.

In one or more embodiments according to the first, second or third aspect, the VIG unit further comprises a low-emissivity coating deposited on the second interior major surface of the second glass pane, and a second edge region in proximity to the edge of the second glass pane, defined as where none or a reduced part of the low emissivity coating is present, and wherein said side seal is arranged at a minimum separation distance $(d1\_min)$ of at least 1 mm, such as at least 1.5 mm, such as at least 2 mm, or such as at least 3 mm from both low emissivity coatings.

In one or more embodiments, the size of the minimum separation distance $(d1\_min)$ provided on the first and second glass panes may be different or similar. In one or more embodiments, the glass panes may be approximately the same or at least manufactured by the same process prior to being paired. The second glass pane may comprise any of the features and embodiments as described in relation to the first glass pane according to previous and following aspects of the present disclosure.

In one or more embodiments, the width of the of the edge region of the first glass pane may be substantially equal to the width of the edge region of the second glass pane. In one or more embodiments, the width of the edge region may be measured to the boundary of the complete low emissivity coating e.g. at the side surface of the low emissivity coating. The width may be measured along the interior major surface, perpendicular to the edge of the pane.

In one or more embodiments according to the first, second or third aspect said side seal extends from a portion of said edge region of said first glass pane to a portion of said edge region of the second glass pane.

In one or more embodiments, the side seal is bonded to a portion of said edge regions of the first and second glass panes. A single seal material may be extending between the bonded surfaces, thereby reducing intermediate bond interfaces that are subject to the risk of leaking.

In one or more embodiments according to the first, second or third aspect the side seal is arranged at a minimum separation distance $(d1\_min)$ between 1-10 mm, such as 1-5 mm, or such as between 1-3 mm from said low emissivity coating.

In one or more embodiments according to the first, second or third aspect the side seal is arranged at a minimum separation distance $(d1\_min)$ between 1.5-10 mm, such as 1.5-5 mm, or such as between 1.5-3 mm from said low emissivity coating.

In one or more embodiments, the minimum separation distance $(d1\_min)$ may be small e.g. between 1-4 mm, such as between 2-3 mm or such as 1-2 mm, or it may be between 2-6 mm, or 3-7 mm or 5-10 mm or 6-8 mm or 3-5 mm or 2-4 mm. In one or more embodiments, the width of an intermediate edge region, extending from the low emissivity coating to the side seal may be depending on and substantially similar to the extent of the minimum separation distance $(d1\_min)$.

Surprisingly, the inventor has found that only a relatively small intermediate edge region needs to be provided e.g. only a small part of the low emissivity coating needs to be removed or reduced, thereby allowing for the majority of VIG unit to be provided with the low emissivity coating. Generally, the relatively small minimum separation distance $(d1\_min)$ in turn provides an intermediate edge region that has a small width, which has a very small or no impact of the overall performance of the VIG unit, e.g. the overall U-factor of the low emissivity coating.

In one or more embodiments, there may exist an upper limit to the location and the width of the edge region in order to avoid the edge region being visible upon installation of the VIG unit. In one or more embodiments, a frame may be arranged on the VIG unit, covering a part of the edge and exterior major surfaces of the VIG unit, and it may also cover the side seal. In one or more embodiments, the edge region does not extend further towards the centre of the major surface than the frame, whereby it potentially does not affect the insulating and solar control properties as well as being visible through in the viewing area of the VIG unit.

In one or more embodiments, the edge region extends from the edge of the glass pane to the low emissivity coating, and a width of the edge region is measured along this extent. A frame may enclose the edge of the VIG unit and overlap a part of the VIG unit at the edge such as a part of the major surfaces of the glass panes adjacent to the edge of the VIG unit and the side seal. In such embodiments, the edge region may be of a smaller width than the overlap width of the frame, such that the frame may additionally hide the edge region and furthermore, such that edge region does not significantly affect the overall performance of the low emissivity coating.

In one or more embodiments, the overlap width of the frame overlapping the VIG unit, measured along the major surfaces of the glass panes, may be approximately 12 mm, the width of the side seal may be approximately between 7-9 mm, and the width of the edge region may be below 12 mm, such that edge region un-bonded to the side seal, including the intermediate edge region, is of a width approximately between 3-5 mm.

In one or more embodiments, the frame may comprise any suitable isolation means for aiding in the isolating effect of the VIG unit.

In one or more embodiments according to the first, second or third aspect, the low emissivity coating comprises a side surface towards the edge region and wherein said side seal is arranged at said minimum distance (d1_min) from said side surface.

In one or more embodiments, the low emissivity coating may comprise underlying parts of the low emissivity coating may be of large chemical sensitivity. These underlying layers may be exposed at the edge of the low emissivity coating along the side surface of the low emissivity coating and therefore it may be particular importance to ensure the minimum separation distance from possible chemically sensitive parts of the side surface to the side seal. Additionally the top surface may be a substantially chemically resistant top surface for the present application.

In one or more embodiments according to the first, second or third aspect, the low emissivity coating comprises a plurality of coating layers, and wherein said edge region comprises a reduced number of said coating layers.

In one or more embodiments, the low emissivity coating may be a coating stack comprising a plurality of coating layers, of which at least one or more are of particularly high chemical sensitivity. In one or more embodiments, these coating layers may, for the majority of low emissivity coating, be protected from species by coating layers lying above. The coating layers may especially be sensitive to temperature changes, humidity, radiation and ambient atmosphere, containing acid medium or alkaline medium and/or pollutants.

One or more of the coating layers may have the purpose to protect one or more coating layers in the proximity, e.g. coating layers, which are mainly tasked to aid in providing the desired transmission and reflection properties for the VIG unit. One or more of the coating layers may both provide protection and the aid in obtaining the desired optical properties. Generally, all coating layers that are not present in the edge region may be exposed at the side surface of the low emissivity coating.

The side surface of the low emissivity coating layer may expose at least some of the plurality of coating layers to chemical interaction, which would be otherwise protected, but the provided minimum separation distance (d1_min) surprisingly significantly reduces the occurrence of chemical attack on the low emissivity coating, even in embodiments where the sides of the coating layers are still exposed.

In one or more embodiments, some coating layers may be arranged at a shorter distance to the side seal than other coating layers, e.g. depending on the edge deletion tools or low emissivity coating structure. In one or more embodiments, all coating layers are negatively affected when in contact or within the minimum separation distance from the side seal and therefore these are all arranged at a distance from the side seal, which is equal or larger than the minimum separation distance (d1_min).

In one or more embodiments, the low emissivity coating may comprise stack of coating layers typically comprising metals, metal oxides, and metal nitrides. The stack may comprise coating layers made of one or more inorganic oxides such as titanium oxide ($TiO_x$) or Zinc oxide ($ZnO_x$).

The low emissivity coating may be chemically sensitive to acids, alkalis, gases, metals, and/or metal oxides. Titanium oxide is of an excellent chemical sensitivity than Zinc oxide, which has a moderate sensitivity to alkalis and a poor sensitivity to acids. Alkaline solutions of moderate strength are much less corrosive than corresponding concentrations of acid, but may still affect the integrity of the Zinc oxide coating layer. In one or more embodiments, a majority or all of the low emissivity coating materials are especially sensitive to outgassed species from a binder material present in a low melting point side seal material.

In one or more embodiments, the low emissivity coating layer may comprise a stack of coating layers comprising one or more of the following elements: $ZrO_2$ (which may be arranged as a uppermost coating layer), $Si_xN_y$ such as $Si_3N_4$, $SnO_x$, a layer comprises Ni and/or Cr such as $NiCrO_3$, $TiO_x$, $ZnO_x$, $ZnAlO_x$, $Si_xN_yO_z$ or a layer of Ag. There may be coating layers that reoccur in the coating stack sequence.

Due to the species contained in the side seal material and in the low emissivity coating and their close physical proximity in combination temperature changes of the VIG undesirable chemical interactions have shown to occur. A degradation in low emissivity coating integrity, due to the side seal material being in the proximity, may in turn may further reduce the resistance of the low emissivity coating to further chemical attack. Providing said minimum separation distance (d1_min) between the side seal and the low emissivity coating may significantly reduce or prevent an initiation of one or more of vast existence of possible undesirable chemical interactions between species of the low emissivity coating and the side seal material. In one or more embodiments, the low emissivity coatings include one or two silver layers each sandwiched between two layers of a transparent dielectric film. Generally, by increasing the number of silver layers the total infrared reflection may be increased.

The silver layer(s) of the low emissivity coating stack account for a large portion of the functionality and performance of the low emissivity coating and therefore it is particularly important to maintain the integrity of the silver layers throughout the lifetime of the VIG unit. A change in the integrity of the Ag layer may negatively impact the coating's durability and/or colour.

In one or more embodiments according to the first, second or third aspect, the low emissivity coating comprises a silver layer (5_Ag) and wherein the side seal is arranged at said minimum separation distance (d1_min) from said silver layer.

In one or more embodiments, the low emissivity coating may comprise one or more sputtered layers of silver (Ag). The minimum separation distance may at least be provided from said silver layer to said side seal in the VIG unit. The silver coating may especially be sensitive to temperature, humidity, radiation, and ambient atmosphere, e.g. it may react with free radicals or with acid or alkaline mediums. Delamination of the silver coating may especially occur when interacting with hydrogen sulphide, sulphur dioxide or hydrochloric acid. Generally, the silver coating may react readily with sulphur, sulfur compound, chloride ions, or sulphate ions. Corrosion of silver in an alkaline environment may particularly take place when water and oxygen is present.

In one or more embodiments according to the first, second or third aspect, said reduced number of coating layers in said edge region is devoid of a silver layer (5_Ag).

By having an edge region devoid of a silver layer, the minimum separation distance between the side seal and the silver layer may be more effectively ensured while the risk of corrosion and chemical interaction between the layer and the side seal is substantially reduced, even when intermediate coating layers are present.

In one or more embodiments, any suitable glass may be used for the glass panes, for example a soda lime silica glass or an alkali aluminosilicate glass. The glass panes can have the same or different thickness, and the thickness can be 1 to 6 mm, such as 2 to 4 mm, or such as 2.5 to 3.5 mm. The glass panes are substantially transparent to visible light (i.e. at least about 50% transparent, or such as at least about 70% transparent, or such as at least about 80% transparent, and or such as at least about 90% transparent), although they may be tinted in some embodiments.

In one or more embodiments of one or more aspects of the present disclosure, the cavity gap size measured from the first interior major surface to the second interior major surface may within the range of 0.1 to 0.5 mm, such as in the range of 0.15 to 0.3 mm. Cavity gap size may be on average at least 0.1 mm or at least 0.2 mm in size. The gap can be larger or smaller as long the insulation effect of the VIG unit is sufficiently maintained. The present range of gap sizes are large enough to sufficiently reduce heat transfer between panes through conduction heating and small enough to sufficiently restrict heat transfer by convection currents caused by any remnant air. Thermally tempered glass panes may comprise a larger variation in gap size across the interior surfaces. In some embodiments, this can result in a gap size which may vary by up to +/−0.1 mm. In one or more embodiments, the cavity is low pressure cavity at a pressure below $10^{-3}$ mbar, such as below $10^{-4}$ mbar or below $10^{-5}$ mbar.

The high level vacuum level at very low pressure levels relative to atmospheric pressure are desirable as they can provide a reduction in heat losses, such as conductive heat losses, across the VIG unit, i.e. through the cavity. Generally, decreasing the pressure in the cavity can in turn provide a decrease in thermal conductivity across the cavity and thereby provide a larger degree of insulation.

One or more support structures may be arranged between the interior major surface of the first glass pane and the interior major surface of the second glass pane. The support structure may be arranged in the cavity for maintaining the gap distance between the glass panes in the VIG unit, also in the case the gap distance between the glass panes experience small variations due to e.g. a physical impact or thermal influences.

In one or more embodiments of one or more aspects of the present disclosure, the support structures may have a height of 0.05 to 0.7 mm, such as 0.1 to 0.4 mm, or such as 0.15 to 0.3 mm. In one or more embodiments, the support structure comprises a plurality of spacers distributed within the cavity. The spacers may have the same height. In another embodiment, each spacer independently has a height of 0.05 to 0.7 mm, such as 0.1 to 0.4 mm, or such as 0.15 to 0.3 mm. The spacers can have width of 0.1 to 1 mm, such as 0.2 to 0.8 mm, or such as 0.3 to 0.7 mm.

In one or more embodiments of one or more aspects of the present disclosure, the support structure may be of any suitable material, for example solder glass, a polymer (e.g., Teflon), plastic, ceramic, glass, metal, or the like. The spacer may comprise a steel or a solder glass. Examples of spacers are shown in e.g. WO 2016/027750 and WO 2016/144857, and the spacers may be provided as a glass frit paste that is printed onto the inner surface of at least one of the two glass panes and subsequently heated to form the spacers as shown in e.g. AT 14327 U. A spacer may comprise a metal, a ceramic, or a glass, a steel or a solder glass. Each adjacent spacer may be arranged with a distance of 20 to 120 such as 25 to 80, or such as 30 to 60 mm between them.

The VIG unit according to the first, second or third aspect of the present disclosure may comprise any of the features and advantages described in relation to the VIG unit according to the first, second or third aspect of the disclosure.

In one or more embodiments according to the first, second or third aspect, said first glass pane or said second glass pane or both are tempered glass panes, such as tempered glass pane.

Tempered glass panes are of high thermal and mechanical strength due to internal compressive and tensional stresses. As a result of using tempered glass, a lower amount of support structures may be needed between the panes in order to withstand the atmospheric pressure on the panes and minimize bending of the panes towards the cavity. With tempered glass, supports structures consisting of spacers may be separated with a distance above 35 mm, such as 40 mm or such as 50 mm, thereby minimizing the visible distraction that may be experienced due to the spacers when looking through the glass and minimizing the heat transfer between the glass panes.

The fourth aspect of the disclosure relates to a window comprising a VIG unit according to any of the embodiments of the first, second or third aspect and further comprising with a window frame.

In one or more embodiments, the window may be for a fixed or ventilating window of a commercial building and/or residential building, e.g. as a roof window or a skylight window, e.g. a fixed or ventilating window for a roof or a skylight. In one or more embodiments, the window may be installed in a vertical orientation, such as on the side of a commercial and/or residential building. The vacuum insulated glazing (VIG) unit, glass pane, and window described herein may also be used for other applications that use a window or transparent screens, for example viewports, console screens, time pieces, vehicles, and others.

In one or more embodiments, the first glass pane may be arranged to face the interior of the housing or the exterior of the housing, and the same applies for the second glass pane.

The fifth aspect of the disclosure relates to a method of assembling a vacuum insulated glazing (VIG) unit, wherein the VIG unit comprises a first glass pane, having a first interior major surface and a first exterior major surface and a second glass pane having a second interior major surface and second exterior major surface, the glass panes are arranged to be placed in parallel with said interior major surfaces facing each other, the VIG unit further comprises a low emissivity coating deposited on at least a part of at least the first interior major surface, and
  a seal material for providing a side seal, wherein the method comprises the steps of
  providing said seal material at the edge of the glass panes so as to create a cavity between said glass panes,
wherein said seal material is arranged so as to ensure a minimum separation distance (d1_min) of at least 1.5 mm, such as at least 2 mm, or such as at least 3 mm, from said seal material to said low emissivity coating.

A VIG should maintain the low pressure for many years, however outgassed species from the glass panes, side seal material and low emissivity coating may significantly alter the structure of nearby element due to chemical interaction and further, directly or indirectly, alter the pressure level within the cavity and reduce the lifetime of the VIG unit. Furthermore, a direct contact between low emissivity coatings and the side seal may introduce micro cracks in the seal, which may slowly increase the pressure in the VIG unit.

Surprisingly, the inventor has found that the problem of disadvantageous interaction of species in the cavity between the low emissivity coating and the side seal, can be significantly reduced by providing minimum separation distance (d1_min) thereby ensuring a protection against chemical interaction between any outgassed species, which may in turn produce outgassing from the coating and reduce the integrity of the VIG unit. Furthermore, any further treatments of the low emissivity coating or the side seal is thereby avoided.

In one or more embodiments according to the fifth aspect, said VIG unit comprises an edge region defined as the region on said first interior major surface being devoid of a low emissivity coating or comprises a reduced low emissivity coating, and wherein said seal material is provided on at least a portion of said edge region.

The sixth aspect of the disclosure relates to a method of assembling a vacuum insulated glazing (VIG) unit, wherein the VIG unit comprises a first glass pane, having a first interior major surface and a first exterior major surface and a second glass pane having a second interior major surface and second exterior major surface, the glass panes are arranged to be placed in parallel with said interior major surfaces facing each other, the VIG unit further comprises
a low emissivity coating deposited on at least a part of at least the first interior major surface, and
a edge region near the edge of the first glass pane, wherein the edge region comprising a reduced or no low emissivity coating,
a side seal material of a glassy seal material for providing a side seal, wherein the method comprises the steps of
providing said glassy seal material on at least a portion of said edge region so as to create a cavity between said glass panes, wherein said glassy seal material is arranged so as to ensure an intermediate edge region is not bonded to said seal material, wherein the intermediate edge region extends from said glassy seal material to said low emissivity coating.

In relation to the fifth and sixth aspect, the inventor has surprisingly found indications that the problem of disadvantageous interaction of species of the low emissivity coating and the side seal material can be significantly reduced or even prevented by providing an edge region, having a reduced thickness of the low emissivity coating, where the thickness is measured perpendicular to the interior major surface. The edge region may be in proximity to the edge of the first glass pane.

In one or more embodiments according to the fifth or sixth aspect, the side seal material is provided for joining said first and second glass pane near the edge of said glass panes. The side seal material may be bonded to the edge and/or the interior major surface or both of the first glass pane. The side seal material may additionally be bonded to the edge and/or the interior major surface of the second glass pane. The edge of the glass panes extend from the interior major surface to the exterior major surface of the glass panes, where the interior major surface faces the cavity and the opposing glass pane.

In one or more embodiments according to the fifth or sixth aspect, the method may comprise the step of providing said side seal material between said first glass pane and said second glass pane, e.g. at least in direct contact with the interior major surface of the first glass pane, e.g. such that a direct bond between the first interior major surface and the side seal material may be obtained. Additionally or alternatively, the side seal material may be provided such that the side seal material is in direct contact with the second interior major surface of the second glass pane, e.g. such that a direct bond between the second interior major surface and the side seal material may be obtained. In one or more embodiments, the side seal may be extending from the first glass pane to the second glass pane.

In one or more embodiments, the side seal material may be provided by arranging a side seal material near the edge of the glass pane, e.g. in a paste, solid or powder form. In one or more embodiments, the side seal material may be provided before or after pairing the glass panes, e.g. the glass panes may be arranged with opposing interior major surfaces before providing said side seal material.

In one or more embodiments of the fifth or sixth aspect of the disclosure, the side seal material is heated to a first temperature (T1) at least to facilitate the forming of a side seal. The side seal material may be a glassy sealing material such as a low melting point glass frit material, e.g. it may be a lead-free low melting point glass material.

In one or more embodiments according to the fifth or the sixth aspect of the disclosure, the side seal may be heated by selective heating means capable of localized heating, such as laser heating or ceramic or electric heating elements, or in a furnace, by which the entire VIG unit is heated. In one or more embodiments, the side seal may provide an enclosed cavity between the panes, which is evacuated prior or post sealing by the side seal, e.g. through an evacuation opening in the glass pane or the side seal. The cavity may be evacuated using a vacuum chamber enclosing the entire VIG unit or a vacuum cup or tube connected to the evacuation opening. In one or more embodiments, the cavity is evacuated to a low pressure so as to provide high level vacuum.

In one or more embodiments, according to the fifth or sixth aspect of the disclosure, the method of manufacturing a VIG unit comprises the step of heating a side seal material, being a glassy sealing material, to soften said material and possible also burnout and fire the material so as to drive out the solvents and binder, if such are present in the glassy seal material. This may results in a fusion of glass elements within the glassy seal material. Additionally, the temperature of the glassy seal material may be raised to a first temperature (T1) so as to bond said glassy seal material to surfaces to be bonded, e.g. the edge region. Thereafter, the glassy seal material may be cooled to a curing temperature (Tcure) so as to cure said sealing material to form a hermetic side seal. The cavity may be evacuated when during cooling of the glassy seal material. During evacuation, the side seal material may still be deformable, such that the glass panes are forced together by the applied low pressure and/or by using clamps arranged to force the panes together to a desired arrangement.

In one or more embodiments, according to the fifth or the sixth aspect, the side seal material is arranged on a glass pane prior to the step of depositing said low emissivity coating on the interior surface of said glass pane. The low emissivity coating may be deposited on centre parts of the interior major surface, and thereby simultaneously provide an edge region along the edge of the glass pane.

In one or more embodiments according to the fifth or sixth aspect, said VIG unit further comprises a barrier material, and wherein the method comprises the step of covering at least a part of said low emissivity coating, so as to provide a minimum buffer distance (d2_min) between said low emissivity coating and said side seal material.

In one or more embodiments, the low emissivity coating comprises a side surface directed towards the side seal material, wherein the method comprises the step of covering at least a part of said side surface with said barrier material so as to provide a minimum buffer distance (d2_min) between the low emissivity coating and said side seal material. Additionally or alternatively, the barrier material may provide a distance between the side seal material and the low emissivity coating, measured through the cavity and not through the barrier material etc., which is equal or larger than the minimum separation distance (d1_min). The distance measured is a distance available for species to travel between the side seal material and low emissivity coating within the cavity, e.g. during evacuation of the cavity.

In one or more embodiments according to the sixth aspect, the method comprises the step of arranging said side seal material at a minimum separation distance (d1_min) of at least 1 mm, such as at least 1.5 mm, such as at least 2 mm, or such as at least 3 mm to said low emissivity coating.

In one or more embodiments of the fifth or sixth aspect, the minimum separation distance (d1_min) may be approximately at least 1.1, such as 1.4 or such as 1.7 mm. In one or more embodiments, the minimum separation distance (d1_min) may be approximately at least 2 mm, such that the side seal is separated from the low emissivity coating by at least 2 mm at any point within the VIG unit. In one or more embodiments, the minimum separation distance (d1_min) may be approximately at least 2.5, 3.0, 3.5, 4.0, 4.5, 5.0, 5.5 or 6.0 mm, such that the side seal is separated from the low emissivity coating by at least 2.5, 3.0, 3.5, 4.0, 4.5, 5.0, 5.5 or 6.0 mm at any point within the VIG unit.

In one or more embodiments according to the fifth or sixth aspect, the distance is measured from the boundary of the side seal and to the nearest boundary of the low emissivity coating, such as from the top surface or side surface of the low emissivity coating along a straight line to a boundary of the side seal, e.g. uncovered surface of the side seal.

The direction along with the shortest distance may be orientated generally depends on the nature and shape of the side seal and the shape of the low emissivity coating in proximity to one another. The minimum separation distance may therefore be measured along different directions for different arrangements of the side seal and low emissivity coating.

In one or more embodiments according to the fifth or sixth aspect, the method comprises the step of
providing said side seal material at a minimum separation distance (d1_min) between 1-10 mm, such as 1-5 mm, or such as between 1-3 mm from said low emissivity coating.

In one or more embodiments according to the fifth or sixth aspect, the method comprises the step of
providing said side seal material at a minimum separation distance (d1_min) between 1.5-10 mm, such as 1.5-5 mm, or such as between 1.5-3 mm from said low emissivity coating.

In one or more embodiments, the minimum separation distance (d1_min) may be small e.g. between 1-4 mm, such as between 2-3 mm or such as 1-2 mm, or it may be between 2-6 mm, or 3-7 mm or 5-10 mm or 6-8 mm or 3-5 mm or 2-4 mm. In one or more embodiments, the width of an intermediate edge region, extending from the low emissivity coating to the side seal may be depending on and substantially similar to the extent of the minimum separation distance (d1_min).

Surprisingly, the inventor has found that only a relatively small intermediate edge region needs to be provided e.g. only a small part of the low emissivity coating needs to be removed or reduced, thereby allowing for the majority of VIG unit to be provided with the low emissivity coating.

Generally, the relatively small minimum separation distance (d1_min) in turn provides an intermediate edge region that has a small width, which has a very small or no impact of the overall performance of the VIG unit, e.g. the overall U-factor of the low emissivity coating.

In one or more embodiments, the edge region does not extend further towards the centre of the major surface than a frame, which is to be arranged on the VIG unit, such that the edge region does not affect the insulating and solar control properties as well as being visible through in the viewing area of the VIG unit. The edge region may extend from the edge of the glass pane to the low emissivity coating, and a width of the edge region is measured along this extent.

In one or more embodiments according to the fifth aspect or sixth aspect, said minimum separation distance (d1_min) is ensured across the entire first glass pane or second glass pane or both.

The minimum separation distance (d1_min) may be provided in all points within the VIG unit such that there exist no weak points at which a leak may be developed. A single leak into the cavity is enough to significantly reduce several beneficial effects of the VIG unit, such as the isolating function of the VIG unit. The side seal material may be arranged near the entire peripheral edge of the glass panes, such as in a continuous band of side seal material.

In one or more embodiments according to the fifth or sixth aspect, the method further comprises the step of
heating said VIG unit to a first temperature (T1), so as to bond said side seal material to said glass panes.

In one or more embodiments according to the fifth or sixth aspect, the side seal material is heated to a first temperature (T1) sufficient to bond the side seal material to the surfaces to be bonded, e.g. a part of the edge region, an edge or an interior major surface of the glass pane.

In one or more embodiments according to the fifth or the sixth aspect, the side seal material is a low melting point glass frit material and the first temperature (T1) is between 320-425 degrees Celsius, such as between 330-400 degrees Celsius, such as between 340-380 degrees Celsius or such as between 340-360 degrees Celsius. Prior to heating to said first temperature (T1), the side seal may be heated to a temperature of at least 250 degrees C., such as at least 270 degrees Celsius to allow sintering of the material.

In one or more embodiments according to the fifth or the sixth aspect, the first temperature is below 450 degrees, such as below 425 degrees Celsius. This upper limit on the first temperature is in particular beneficial for the maintaining the integrity of tempered glass panes.

In one or more embodiments, the first temperature (T1) may be maintained between least 5 min-80 min, such between 15 min-75 min, such as between 25 min-65 min or such as at least 35 min. E.g. a low melting point frit material may be maintained for a time between 50-70 min at a first temperature (T1) between 360-390 degrees Celsius.

In one or more embodiments according to the fifth or the sixth aspect, the method comprises the step of changing the temperature of said VIG unit to a curing temperature (Tcure) between 250-380 degrees Celsius, such as between 260-360 degrees Celsius, or such as between 275-300 degrees Celsius.

In one or more aspects, the evacuation of the cavity is initiated while the temperature of the side seal material is close to the curing temperature (Tcure), e.g. within 10 degrees Celsius, or within 15 degrees Celsius of the curing temperature (Tcure).

An evacuation at the present curing temperature (Tcure) may provide a thermal cleaning by evacuating gas such as air and contaminants from the cavity. Additionally it may force the glass panes towards each other. During the evacuation process, it is advantageous to operate at relatively high temperatures as impurities and contaminants from the low melting point glass frit materials, low emissivity coating and the glass panes thereby become increasingly released and evacuated from the interior of the VIG unit.

In one or more embodiment, where a low melting point glass frit material is used, the present curing temperatures provides a viscosity of the side frit material, which is in a deformable state, which permit the glass panes to move towards each other without creating any undesirable internal stresses along the glass panes during the evacuation of the cavity. Furthermore, it provides a viscosity, which is sufficiently high to withstand the applied vacuum pressure and being sucked into the cavity.

In one or more embodiments, the temperature of the VIG unit is changed to the curing temperature (Tcure) so as to initiate evacuation of the cavity and/or to provide a side seal from the side seal material or both.

In one or more embodiments according to the fifth or sixth aspect, the evacuation of the cavity is initiated while the temperature of the side seal material is lowered towards a curing temperature (Tcure).

In one or more embodiments according to the fifth or sixth aspect, the method further comprises the step of evacuating said cavity to a pressure below $10^{-3}$ mbar, such as below $10^{-4}$ mbar or below $10^{-5}$ mbar.

The high level vacuum level at very low pressure levels relative to atmospheric pressure are desirable as they may provide a reduction in heat losses, such as conductive heat losses, across the VIG unit, i.e. through the cavity.

In one or more embodiments according to the fifth or the sixth aspect, the evacuation of the cavity may be provided via an evacuation opening in the first or second glass pane, where the evacuation opening extends from the interior major surface to the exterior major surface of the glass pane. In one or more embodiments, the cavity may be in fluid communication via the evacuation opening with suitable evacuation means comprising a pump. The evacuation opening may be arranged with an evacuation tube sealed to said evacuation opening and providing a pathway through the pane.

In one or more embodiments of the fifth or the sixth embodiments, a support structure may be arranged in the cavity for maintaining the gap distance between the glass panes in the VIG unit, also in the case the gap distance between the glass panes experience small variations due to e.g. an physical impact or thermal influences. The support structures may comprises a plurality of spacers such as metal pillars arranged between the interior major surfaces of the glass panes. In one or more embodiments, the support structures may be arranged on one of the glass panes of the VIG unit prior to pairing said glass panes. The support structures may be in contact with the first and the second interior surfaces of the glass panes. In one or more embodiments, the interior major surfaces may come into contact with support structures during or after evacuation of the cavity, possibly assisted by forcing the panes together by external means such as clamps applying a force on the exterior surfaces of the glass panes.

In one or more embodiments according to the fifth or sixth aspect, the low emissivity coating comprises a silver layer (5_Ag) and wherein said minimum separation distance is measured from said Ag layer to said side seal material and wherein the method comprises the step of arranging said side seal material at said minimum separation distance (d1_min) from said silver layer.

As the silver coating may especially be sensitive to temperature, humidity, radiation, and ambient atmosphere, e.g. it may react with free radicals or with acid or alkaline mediums a separation by the minimum separation distance allows for the integrity of the Ag layer to remain substantially intact.

In one or more embodiments according to the fifth or sixth aspect, the side seal material is a low melting point glass material comprises at least one binder material and at least one solvent material.

In one or more embodiments of one or more aspects of the present disclosure, low melting point glass material are beneficial sealing materials for VIG production, as they comprise good bonding and wetting properties to glass and can be processed over a sufficiently broad temperature region and during rapid heating and/or cooling. Lead-free low melting point glass frit materials both comprise a large operating range of temperatures in which the frit materials is processable and is furthermore environmental friendly. The operating range defines the range of temperatures at which the frit material properties, such as the viscosity and wettability, are considered suitable for the VIG manufacture and for producing an efficient seal can be produced. The low melting point glass frit material may provide a leak-free and rigid side seal in the VIG unit while maintaining its beneficial adhesive properties.

The VIG unit of the fifth or sixth aspect may comprise any of the features and benefits described in relation to the first, second or third aspect of the disclosure. In one or more embodiments according to the fifth or sixth aspect, the vacuum insulated glazing unit is a vacuum insulated glazing unit according to any of the claims 1-26. Correspondingly, the VIG unit according to aspects of the present disclosure may comprise any of the features, embodiments and advantages as describes in relation to the fifth or sixth aspect of the disclosure.

The present disclosure moreover relates to the use of the VIG unit according to the first, second or third aspect of the disclosure as glazing for a commercial or domestic housing or in a vehicle or the like.

The present disclosure further relates to the use of a window with a VIG unit according to the fourth aspect of the disclosure for a housing or building or vehicle, such as domestic or commercial housing building or vehicle.

DRAWINGS

Aspects of the present disclosure will be described in the following with reference to the figures in which.

Table 1 shows experimental emissivity data obtained from a glass pane with a low emissivity coating before (row 1) and after (row 2) thermal treatment.

Table 2 shows experimental emissivity data obtained from a glass pane with a low emissivity coating and low melting point glass frit before (row 1) and after (row 2) thermal treatment.

Table 3 shows experimental sheet resistance data obtained from a glass pane with a low emissivity coating and a low melting point glass frit, before (row 1) thermal treatment, after (row 2) thermal treatment and the calculated difference (A) in sheet resistance between before and after thermal treatment (row 3).

Figure 18:
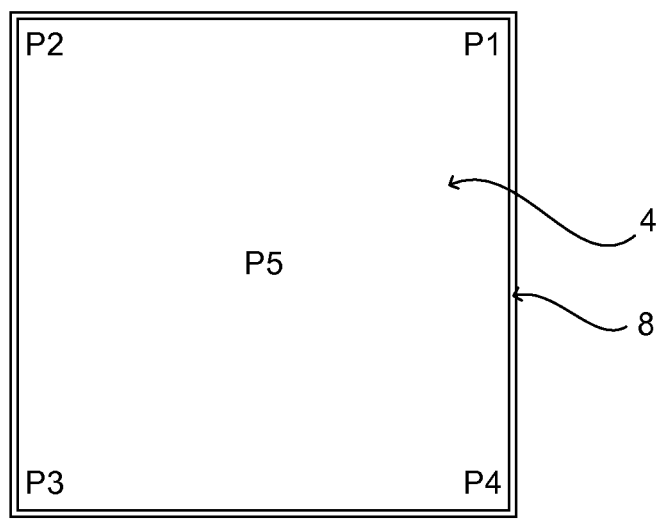

FIG. 18 shows a glass pane from which the sheet resistance data of table 3 is obtained, the glass pane is arranged with a low emissivity coating and low melting point glass.

DETAILED DESCRIPTION OF THE INVENTION

In relation to the figures described below, where the present disclosure may be described with reference to various embodiments, without limiting the same, it is to be understood that the disclosed embodiments are merely illustrative of the present disclosure that may be embodied in various and alternative forms. The figures are schematic and not necessarily to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

It will be understood that, although the terms "first," "second," and the like may be used herein to describe various elements, these elements should not be limited by these terms. These terms are only used to distinguish one element from another element.

Figure 1:
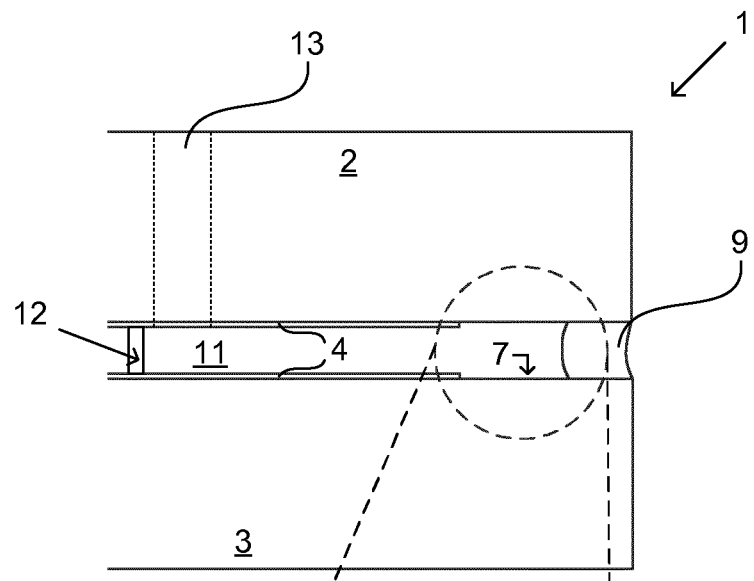
FIG. 1 shows a cross-sectional side view of a part of a VIG unit according to embodiments of the disclosure.

FIG. 1 illustrates a cross-section of a part of an exemplary VIG unit 1 according to embodiments of the disclosure as seen from the side. A first glass pane 2 and a second glass pane 3 are arranged in parallel e.g. such that the peripheral edges 2', 3' of the panes are aligned and such that a gap is provided between two interior major surfaces 2a, 3a of the glass panes 2, 3 placed in opposing manner. In present example, a side seal 9 is arranged in between the interior major surfaces 2a, 3a of the glass panes 2, 3, near the peripheral edge 2', 3' of the interior major surfaces 2a, 3a. The side seal 9 may be extending along the entire peripheral edge 2', 3' of both glass panes 2, 3, so as to fully enclose a cavity 11 between provided by the gap between the interior surfaces 2a, 3a. The side seal material may form a hermetic seal and substantially eliminates any ingress or outgress of gas or air to/from the cavity. The cavity 11 may be evacuated to a high-vacuum level equal to or below about $10^{-5}$ bar, such as below $10^{-6}$ bar, or such as below $10^{-7}$ bar of atmospheric pressure through one or more evacuation openings 13 originally located through the side seal 9 or through one of the glass panes 2, 3 and eventually sealed to provide the VIG unit 1. In order to maintain the gap between said interior surfaces 2a, 2b, a support structure 12 may be provided in the cavity 11. The support structure may in one or more examples, comprise a plurality of pillars, such as metal pillars, evenly distributed though the cavity 11.

FIG. 1 moreover shows a low emissivity coating 4 arranged on both the first interior major surface 2a of the first glass pane 2 and on the second interior major surface 3a of the second glass pane 3. In one or more examples, the low emissivity coating 4 may only be present on the first glass pane 2 or second glass pane 3. Near the peripheral edges 2', 3' of the panes 2, 3, and near the side seal 9 an edge region 7 is provided, in which edge region 7 all or parts of the low emissivity coating 4 is not present. In one or more examples, the low emissivity coating 4 may only be arranged on centre parts of the interior major surfaces 2a, 3a or the low emissivity coating 4 may initially be arranged across the entire interior surface 2a, 3a but subsequently removed near the edge 2', 3', to provide the edge region 7. The edge region 7 may, as shown in the present example, extend from the edge of the low emissivity coating 4 to the edge of the glass pane 2, 3.

In one or more examples, on glass panes 2, 3 having an edge region 7, the side seal 9 is arranged on, and potentially bonded to, the edge region 7, at a minimum separation distance (d1_min) from the low emissivity coating 4. In one or more examples, the side seal 9 may be arranged at a minimum separation distance (d1_min) of 1-3 mm such as approximately 2 mm from the low emissivity coating 4. The side seal may be bonded to the edge region across a width of approximately 7-9 mm such as approximately 8 mm, measured along the shortest width parallel to the major surface of the pane. The edge region width may be between 8-12 mm, such as 10 mm.

Figure 2:
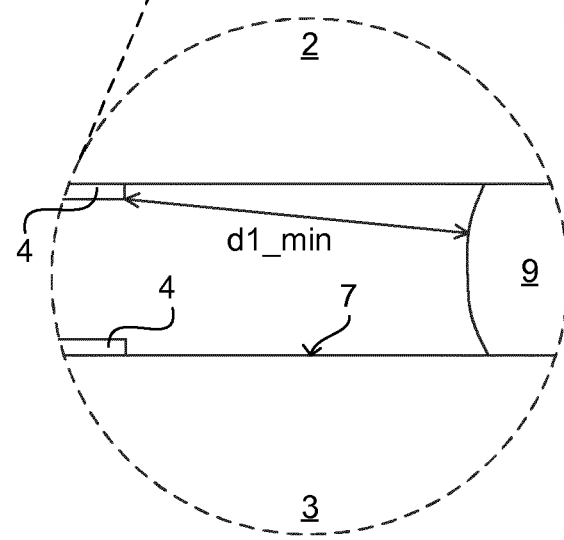
FIG. 2 shows a cross-sectional side view of the circled part of the VIG unit shown in FIG. 1.

FIG. 2 shows a zoomed-in view of a section of the VIG unit 1 shown in FIG. 1, as indicated by the circle in FIG. 1. The side seal shape may have many different shapes depending on the content of the side seal 9 as the manufacturing method of the VIG unit 1. As an example, if the side seal 9 is made of a glassy seal material such as a low melting point glass the shape of the seal 9 may depend on the evacuation process of the manufacturing method. In one or more examples, the shape of a low melting point glass material may change during evacuation as a force is applied on the material towards the cavity 11, resulting in a convex surface shape of the side seal 9 in the finished VIG unit 1.

As shown in FIG. 2, the minimum separation distance (d1_min) is measured along the shortest distance between the side seal 9 and the low emissivity coating 4 is indicated in FIG. 1.

Figure 3:
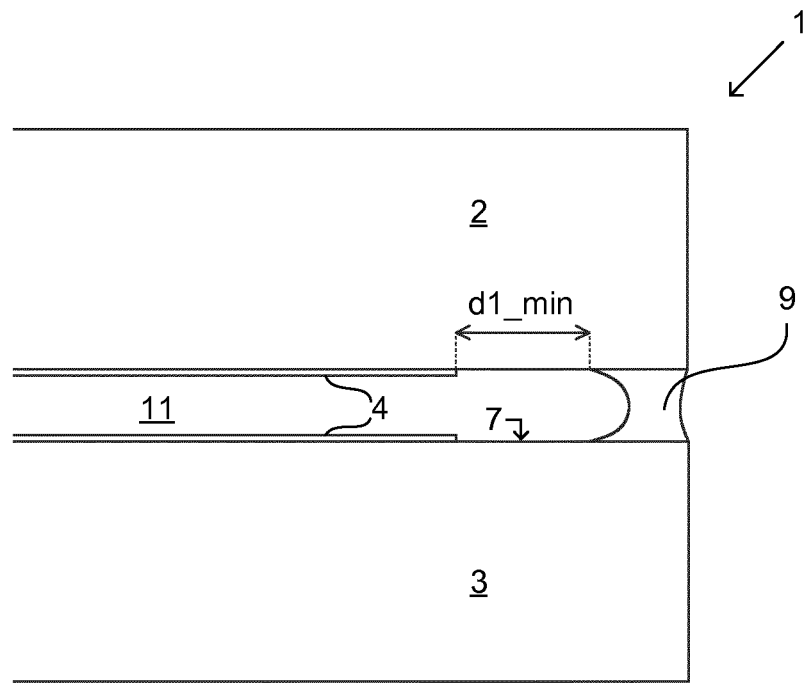
FIG. 3 shows a cross-sectional side view of a part of a VIG unit according to embodiments of the disclosure.

FIG. 3 shows a cross-section of a part of another example of a VIG unit 1 according to the present disclosure. The present VIG unit 1 comprises a side seal 9 having a surface shape towards the cavity 11 with a concave shape, whereby the upper and lower parts of the side seal 9 nearest to the interior major surface 2a, 3a of the glass pane 2, 3 are closest to the upper and lower emissivity coating 4, respectively, as shown in the figure. In one or more examples, the minimum separation distance (d1_min) is provided from the side seal 9 to both low emissivity coatings 4 present in the VIG unit 1. Furthermore, in one or more examples, the minimum separation distance (d1_min) is provided between the low emissivity coating 4 and the side seal 9 throughout the entire VIG unit 1, such that the VIG unit 1 contains no weak parts where a leak or outgassing can potentially occur.

Figure 4:
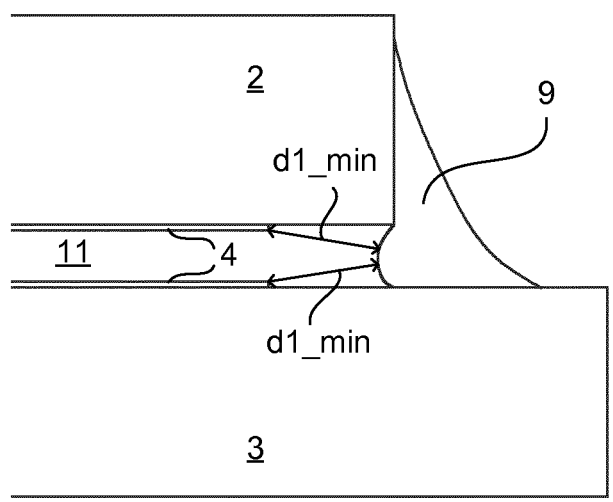
FIG. 4 shows a cross-sectional side view of a stepped edge of a VIG unit according to embodiments of the disclosure.

The first glass pane 2 and the second glass pane 3 may be of equal size of at least the major surfaces 2a, 3a or they may have different dimensions. In one or more examples, one of the glass panes 2, 3 e.g. the second glass pane 3 may comprise major surfaces 3a, 3b being smaller than the major surfaces of the first glass pane 2. When the glass panes 2, 3 are arranged in parallel, the arrangement results in a VIG unit 1 with a stepped edge as shown in FIG. 4. The side seal 9 is arranged from the first interior major surface 2a to the surface of the edge 3' or the second glass pane 3. Additionally, or alternatively, the side seal 9 may also be arranged on the edge region 7 of the second glass pane. As shown in the FIG. 1, the edge region 7 of the first glass pane 2 is larger in width than the edge region 7 of the second glass pane 3.

Figure 5:
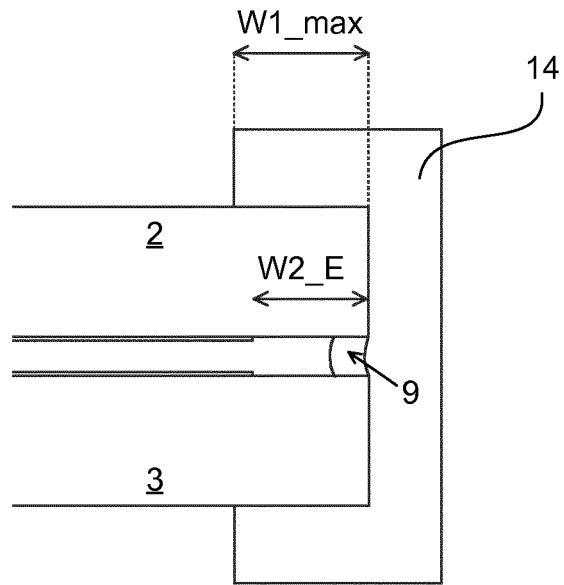
FIG. 5 shows a cross-sectional side view of a part of a VIG unit with a window frame according to embodiments of the disclosure.

FIG. 5 shows the VIG unit 1 as shown in FIG. 1 and FIG. 2 with a window frame 14. The window frame 14 may be any suitable frame for a window for an installation in a housing or vehicle. The window frame 14 is shown enclosing the edge of the VIG unit 1 and covering at least a part of the viewing area of the VIG unit where the VIG unit is of high optical transparency to the human eye. In one or more examples, the edge region 7 may be of a width W2_E smaller than the maximum frame overlap width W1_max, such that the edge region 7 containing a reduced or no low emissivity coating 4 does not have an effect on the overall solar control and insulation property of the VIG unit 1 and furthermore such that it does not visually obstruct the viewing area.

FIG. 6-12 shows across-sectional view of a part of a VIG unit 1 according to embodiments of the present disclosure. The part near the edge 2', 3' of one of the glass panes 2, 3 is shown, where the VIG unit 1 comprises a low emissivity coating 4 deposited on the major interior surface 2a, 3a of the glass pane 2, 3. A side seal 9 is shown to be arranged on the same pane 2, 3. In the present example, the low emissivity coating 4 comprises a stack of plurality of coating layers 5_n layered on top of each other. In one or more examples, the stack may comprise a sequence of the following coating layers 5_n listed from the lowermost coating layer to the uppermost coating layer exposed to the cavity 11: $Si_xN_yO_z$, $TiO_x$, $SnO_x$, $ZnO_x$, Ag, $NiCrO_x$, $SnO_x$, $Si_3N_4$ and $ZrO_2$. The layers 5_n may have a thickness between 1 and 25 nm. In one or more examples, the above stack sequence comprises the following thickness of the coating layers 5_n: 11 nm ($Si_xN_yO_z$), 5 nm ($TiO_x$), 8 nm ($SnO_x$), 15 nm ($ZnO_x$), 11 nm (Ag), 3 nm ($NiCrO_x$), 16 nm ($SnO_x$), 22 nm ($Si_3N_4$) and 2 nm ($ZrO_2$).

Figure 6:
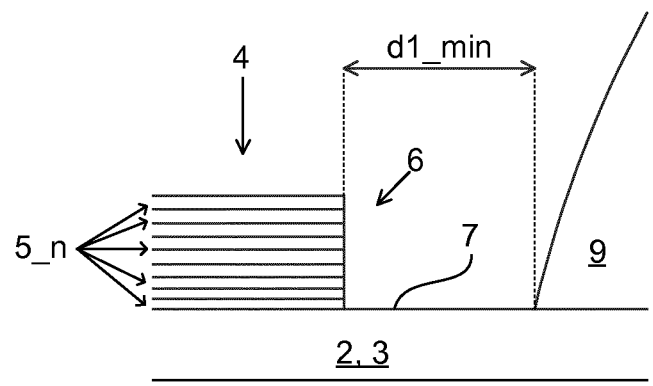
FIG. 6 shows a cross sectional side view of a glass pane, with an edge region devoid of low emissivity coating, for a VIG unit according to embodiments of the disclosure.

The low emissivity coating 4 has a an edge having side surface 6 facing the side seal 9 which is made up of side surfaces 6_n of the plurality of coating layers 5_n, whereby the coating layers 6 are exposed towards the side seal 9. FIG. 6 shows an example of an edge region 7 where no coating layers 5_n are present, and the side seal 9 is capable of bonding directly to the glass surface of the glass pane 2, 3. In one or more examples, during processes removing the entire stack of coating layers 5_n in the edge region 7, such as in abrasive processes, the glass panes 2, 3 may also have parts or a whole surface layer removed in said edge region 7. In FIG. 6, the provided minimum separation distance (d1_min) is indicated in the figure and is in the present example, measured from the side surface 6 of the low emissivity coating 4 to the side seal 9.

Figure 7:
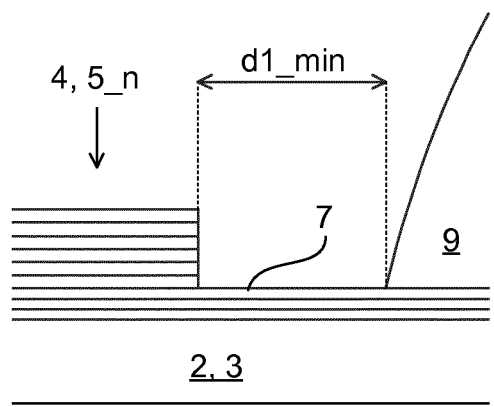
FIG. 7 shows a cross sectional side view of a glass pane, with an edge region with a reduced low emissivity coating, for a VIG unit according to embodiments of the disclosure.

FIG. 7 shows an example where a reduced number of coating layers are present 5_n. Coating layers 5_n can typically be selectively removed, due to a difference in chemical sensitivity or physical strength, or both. In one or more examples, the edge region 7 may comprise $TiO_x$ layer, originating from a low emissivity coating 4 originally present but where coating layers 5_n above the $TiO_x$ layer has been removed to create the edge region 7. A $TiO_x$ coating layer is known to have a higher physical strength, making it more resistant to mechanical wear than other coating layers 5_n typically present in a low emissivity coating stack 4. In one or more examples, the edge region 7 may further comprise a $Si_xN_xO_x$ layer sandwiched between the major interior glass surface 2a, 3a and the $TiO_x$ layer. In one or more examples, the low emissivity coating 4 comprises one or more layers of silver 5_Ag, and the edge region 7 is devoid of any silver layers 5_Ag. E.g. the silver layer(s) 5_Ag may have been removed near the edge 2', 3' of the glass pane 2, 3 in order to create the edge region 7.

In FIG. 7, the provided minimum separation distance (d1_min) is indicated in the figure and is in the present example measured from the side surface 6 of the low emissivity coating 4, exposing side surfaces 6_n of coating layers 5_n of the low emissivity coating 4, to the side seal 9.

Figure 8:
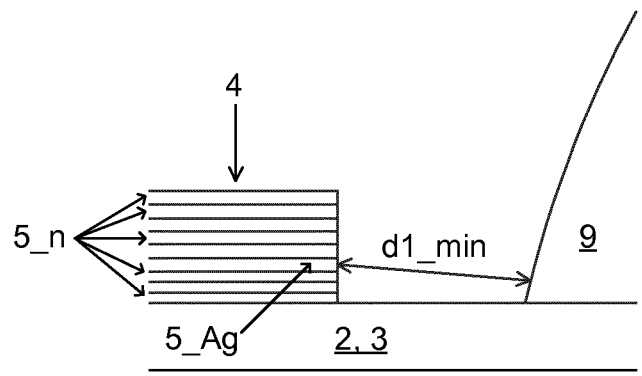
FIG. 8 shows a cross sectional side view of a glass pane, with an edge region devoid of low emissivity coating, for a VIG unit according to embodiments of the disclosure.

During the manufacturing process and/or the lifetime of the VIG unit 1, the side seal 9 may be exposed to temperature changes, solar light and other impacts that may cause the side seal 9 to outgas species which can interact with the low emissivity coating 4. Especially the Ag of the above mentioned example of a low emissivity coating stack is sensitive to gaseous alkaline and acidy species (which may be originating from materials such as binders and/or solvents from the side seal) and may as result undergo structural or chemical changes which can be quite disadvantageous for the VIG unit 1. It is therefore preferred that the minimum separation distance (d1_min) is at least provided between the Ag layer 5_Ag and the side seal 9, as shown in FIG. 8. In the present example, the difference in distance between the side seal 9 and the individual coating layers 5_n are very small. In the present example, the side surface 6 of the low emissivity coating stack 4 is oriented substantially perpendicular to the interior major surface 2a, 3a of the glass pane 2, 3. In one or more examples, the side surface of the low emissivity coating stack 4 may be orientated at another angle than perpendicular to the glass surface 2a, 3a, which can result in a large spread in minimum separation distances (d1_min) depending on from which coating layer 5_n the distance is measured. An example thereof is shown in FIG. 9, where coating layers closer to the glass pane 2, 3 are closest to the side seal 9.

In one or more examples, one or more coating layers 5_n of the low emissivity coating stack 4 may be particularly chemically sensitive and should be placed at a distance equal or larger than the minimum separation distance (d1_min) from the side seal 9. As an example, in FIG. 9 the $4^{th}$ coating layer from the top of the coating stack 4, is identified as a particularly chemical sensitive layer and a distance equal or larger than the minimum separation distance is ensured between the $4^{th}$ coating layer 5_4 and the side seal 9 as shown. The minimum separation distance (d1_min) is indicated along the shortest distance from the side seal 9 to the $4^{th}$ coating layer 5_4.

Figure 9:
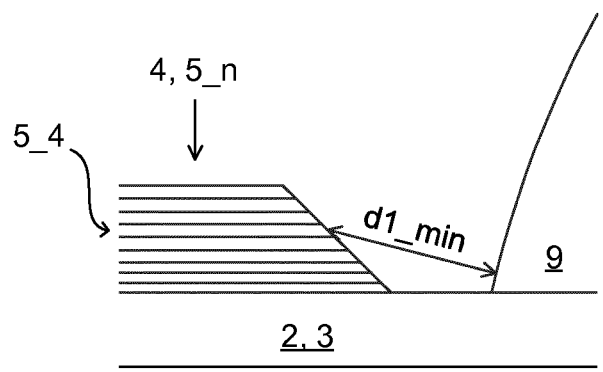
FIG. 9 shows a cross sectional side view of a glass pane for a VIG unit according to embodiments of the disclosure, with an edge region devoid of low emissivity coating, and with an inclined side surface of the low emissivity coating.

In one or more embodiments, with the side surface shape and orientation as shown in FIG. 9, all coating layers 5_n may be sensitive and in such examples, the minimum separation distance (d1_min) should be ensured from the lowest most coating layer 5_n to the side seal 9, such that all coating layers 5_n are separated from the side seal 9 by a distance equal or larger than the minimum separation distance (d1_min).

Figure 10:
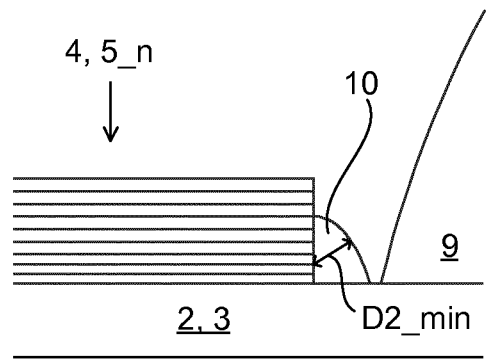
FIG. 10 shows a cross sectional side view of a glass pane for a VIG unit according to embodiments of the disclosure arranged with a barrier material.

FIG. 10 shows a part of a VIG unit 1 according to one or more embodiments of the disclosure, where one or more particularly sensitive coating layers 5_n have been identified and furthermore have had their side surface 6_n covered by means of a barrier material 10. In one or more examples, the barrier material 10 is bonded to at least the side surface(s) 6_n of identified coating layer(s) and furthermore may be bonded to a part of the edge region 7. In the present example, the barrier material is bonded to the identified side surface(s) 6_n and the underlying side surface(s) 6_n and an adjacent part of the edge region 7. The barrier material 10 may be made of an amorphous material such as silicon dioxide ($SiO_2$) or silicon nitride ($Si_3N_4$).

The barrier material 10 allows for the side seal 9 and the low emissivity coating 4 to be placed at a shorter distance from each other than in examples devoid of barrier material 10. In one or more embodiments, the barrier material 10 may provide a minimum buffer distance (d2_min) large enough for the otherwise exposed side surface 6 of the low emissivity coating 4 to be isolated from the side seal 9. Alternatively or additionally, the barrier material 10 may provide a minimum buffer distance (d2_min) large enough for one or more of the otherwise exposed side surfaces 6_n of a plurality of coating layers 5_n of the low emissivity coating 4 to be isolated from the side seal 9. The barrier material 10 arranged in the VIG unit 1 may comprise any shape suitable for the intended purpose of the barrier material 10.

In one or more examples, the minimum buffer distance (d2_min) is measured along the shortest distance from the boundary of the barrier material 10 at or abutting the individual side surface 6_n of the coating layers 5_n to be covered, and to an opposite boundary of the barrier material 10 directed towards the cavity 11 or the side seal 9 as shown in FIG. 10. In one or more examples, the buffer distance (d2_min) may be at least 0.1 nanometre, or such as 10 nanometre, or such as 1 microns. The buffer distance may be below 6 mm, such as below 5 mm, such as below 3 mm or such as below 2 mm. In one or more embodiments, the buffer distance may be equal or less than the minimum separation distance (d1_min) ensured when no barrier material 10 is utilized.

Figure 11:
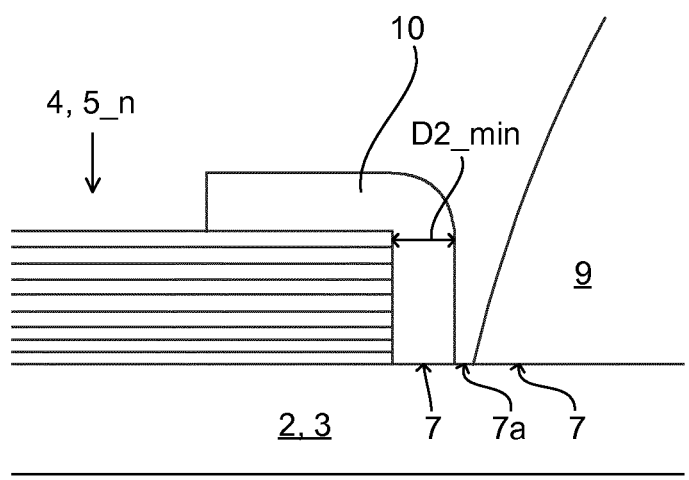
FIG. 11 shows a cross sectional side view of a glass pane for a VIG unit according to embodiments of the disclosure arranged with a barrier material covering the side surface of the low emissivity coating.

In one or more examples, the barrier material 10 may substantially isolate all of the otherwise exposed side surface 6 of the low emissivity coating 4 from the side seal 9. FIG. 11 shows an exemplary low emissivity coating 4 arranged on an interior major surface 2a, 3a of a glass pane 2, 3, where the low emissivity coating 4 is a stack comprising a plurality of coating layers 5_n, having a plurality of side surfaces 6_n. In the present example, the barrier material 10 is arranged from the edge region 7, along the side surface 6 of the low emissivity coating 4, to the top of the low emissivity coating 4 and a distance along the surface of the top of the low emissivity coating 4. The barrier material 10 has thickness providing a minimum buffer distance (d2_min) between the covered part of the low emissivity coating 4 and the side seal 9, may be a very thin coating, down to a few tenths of nanometers or it may be a thick coating of several millimetres. In one or more examples, the barrier material 10 may provide minimum buffer distance (d2_min) between 0.2 nm to 5 mm, such as between 0.2 nm to 2 microns or such as between 1 nm and 1 micron measured from the interface between the barrier material 10 and the low emissivity coating 4 to the surface boundary of the barrier material 10 facing the cavity 11 or side seal 9.

In FIG. 11 the side seal 9 and the barrier material 10 are both arranged on and may be bonded to the edge region 7, with an intermediate edge region 7a in between being exposed to the cavity 11, e.g. for ensuring a non-contact arrangement between the barrier material 10 and the side seal 9. In one or more embodiments, the barrier material 10 may be of a material of a high adhesion efficiency to the chosen side seal material 8, such that the side seal 9 can be arranged in contact with the barrier material 10 and bonded thereto.

Figure 12:
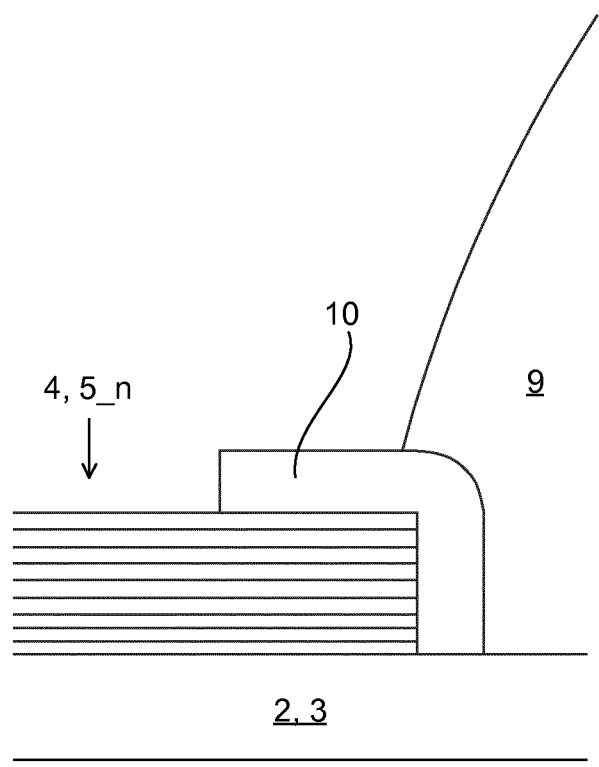
FIG. 12 shows a cross sectional side view of a glass pane for a VIG unit according to embodiments of the disclosure arranged with a side seal arranged on a barrier material.

FIG. 12 shows an example of a part of a VIG unit 1 according to embodiments of the present disclosure, where the VIG unit 1 comprises an arrangement at the edge region 7 of the VIG unit 1, where a side seal 9 and a low emissivity coating 4 is arranged with a barrier material 10 in between. The barrier material 10 may be sufficiently bonded to the side seal 9 and the low emissivity coating 4 so as to avoid any possible delamination between the bonded elements creating pathways for possible leaks and outgassed species. With the barrier material 10 according to examples of the disclosure, the low emissivity coating 4 is thereby effectively isolated from the side seal 9 which may experience outgassing of acidy and alkaline species that may discolour or otherwise damage the low emissivity coating 4.

The VIG units 1 may be arranged with a window frame 14 for installation as a window in buildings, housings, vehicles etc.

The present disclosure also relates to a method of manufacturing a VIG unit 1, a glass pane 2, 3 for a VIG unit 1, a glass pane 2, 3 with a side seal material 8 arranged on the glass pane 2, 3.

In one or more examples, a method of manufacturing a VIG unit 1, may comprise the steps of arranging two glass panes 2, 3 in parallel such that interior major surfaces 2a, 3a are opposing and with a gap in between for providing a cavity 11. It furthermore may comprise the step of providing a low emissivity coating 4 on at least one of the major interior surfaces 2a, 3a of the glass panes 2, 3 and providing a side seal material 8 near the edges 2', 3' of the glass panes 2, 3. The side seal material 8 is arranged such that a minimum separation distance (d1_min) is provided between the low emissivity coating 4 and the side seal material 8 so as to protect the low emissivity coating 4 for interacting with the side seal 8 or species form the side seal 8 and vice versa, such as both during manufacturing of the VIG unit 1 and during the VIG unit 1 lifetime. The cavity 11 is evacuated, such as in order to provide a low-pressure cavity 11 of a pressure towards vacuum pressure.

Figure 13:
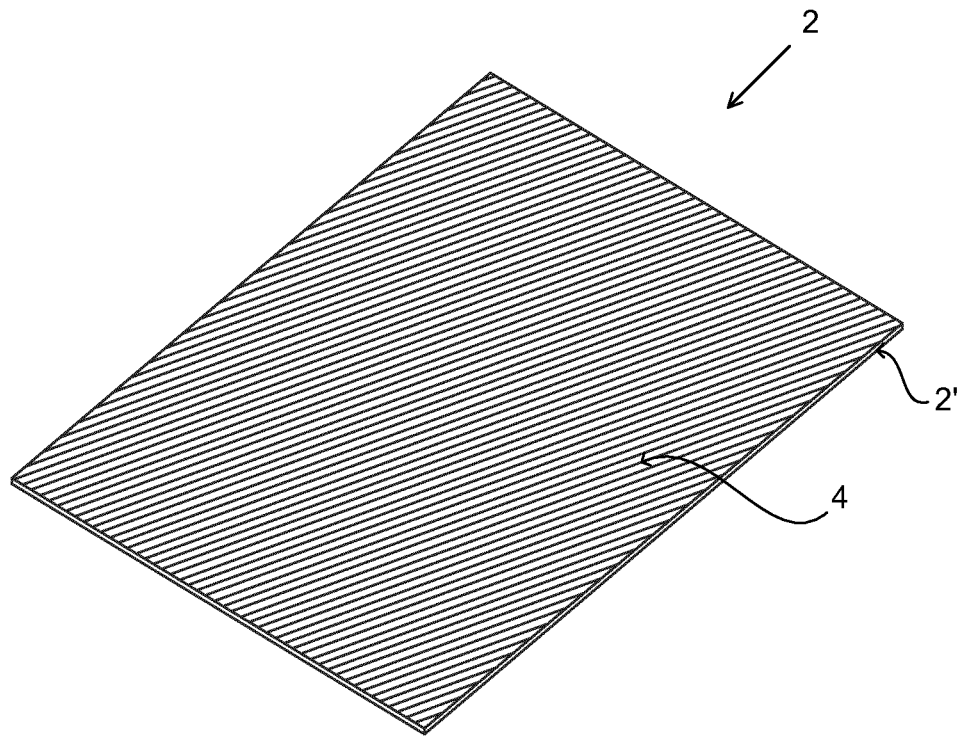
FIG. 13 shows a glass pane according to embodiments of the disclosure comprising a low emissivity coating seen in perspective.
Figure 14:
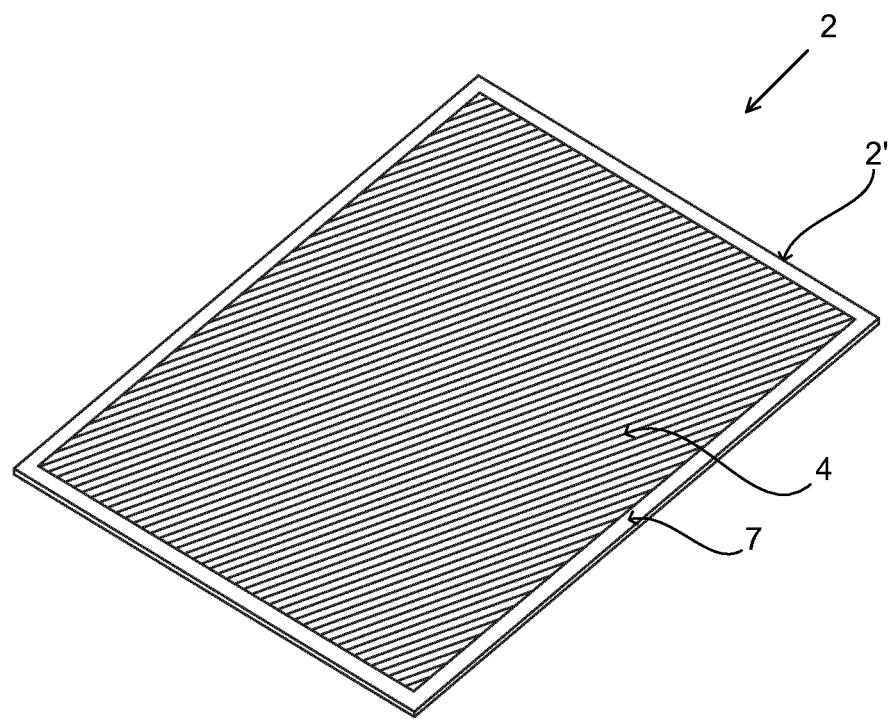
FIG. 14 shows a glass pane according to embodiments of the disclosure comprising a low emissivity coating and an edge region seen in perspective.

In the following examples, the method of preparing a glass pane 2, 3 for a VIG unit 1, is explained in relation to the first glass pane 2, but the method may equally extend to be applied to the second glass pane 3, or the second glass pane 3 may be devoid of any low emissivity coating 4 or sensitive coating layers 5_n thereof. FIG. 13 and FIG. 14 shows a first and a second step of a method of preparing a glass pane 2 for a VIG unit 1. In one or more examples, the first glass pane 2 for the VIG unit 1 is provided with a low emissivity coating arranged across the entire interior major surface 2a of the glass pane 2 as shown in FIG. 13. In one or more examples, the low emissivity coating 4 may only be arranged on centre parts of the interior major surfaces 2a, 3a such that the edge region 7 and the low emissivity coating 4 is provided simultaneously, or the low emissivity coating 4 may initially be arranged across the entire interior surface 2a, 3a. In one or more examples, the side seal material 8 may also be arranged near or on the edge 2', 3' of the panes 2, 3 prior to the deposition of the low emissivity coating 4 which is then applied on centre parts of the interior major surfaces 2a, 3a. In the present example, an edge deletion process is applied to the glass pane 2 shown in FIG. 13, so as to remove a part of the low emissivity coating 4 at the edge 2' of the glass pane 2 and thereby create an edge region 7 comprising no or a reduced low emissivity coating 4 as shown in FIG. 14. In one or more examples, the edge region 7 is a continuous region extending a distance from the edge 2' toward the centre of the interior major surface 2a along the entire edge 2' of the glass pane 2.

In one or more embodiments, the two glass panes 2, 3 may thereafter be paired and provided with a side seal material 8 to create a side seal 9. In one or more alternative embodiments, the side seal material 8 is provided prior to pairing the glass panes 2, 3.

Figure 15:
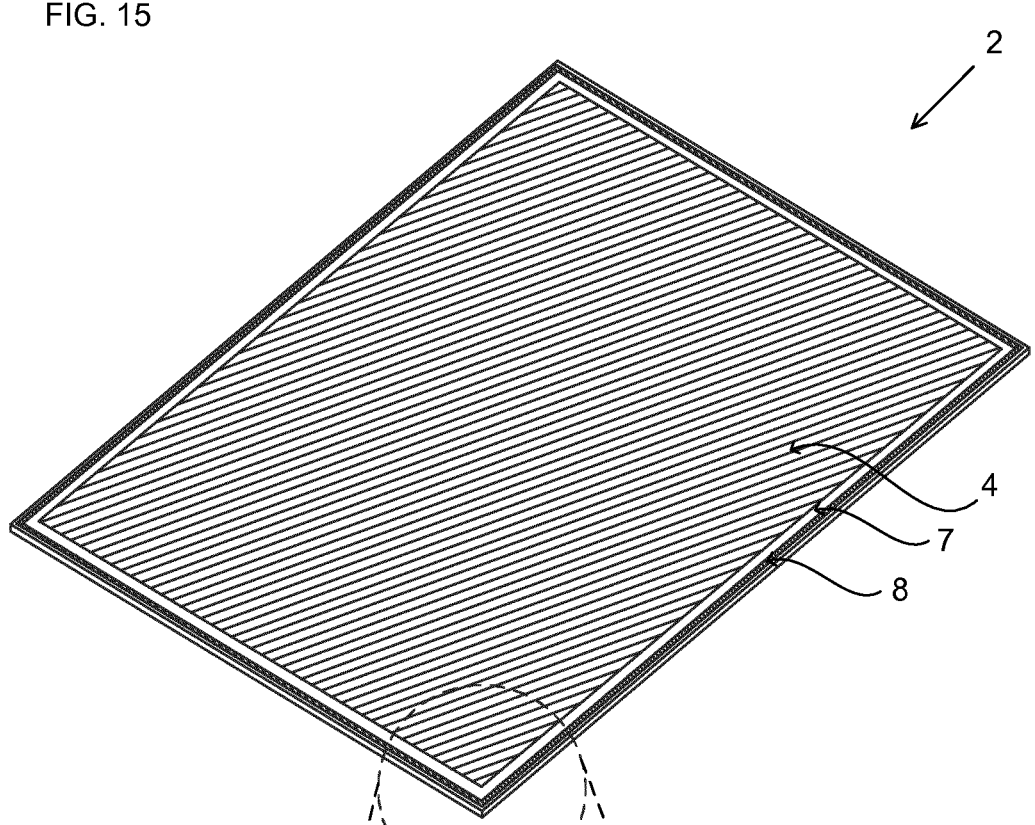
FIG. 15 shows a glass pane according to embodiments of the disclosure comprising a low emissivity coating, an edge region and a side seal material seen in perspective.
Figure 16:
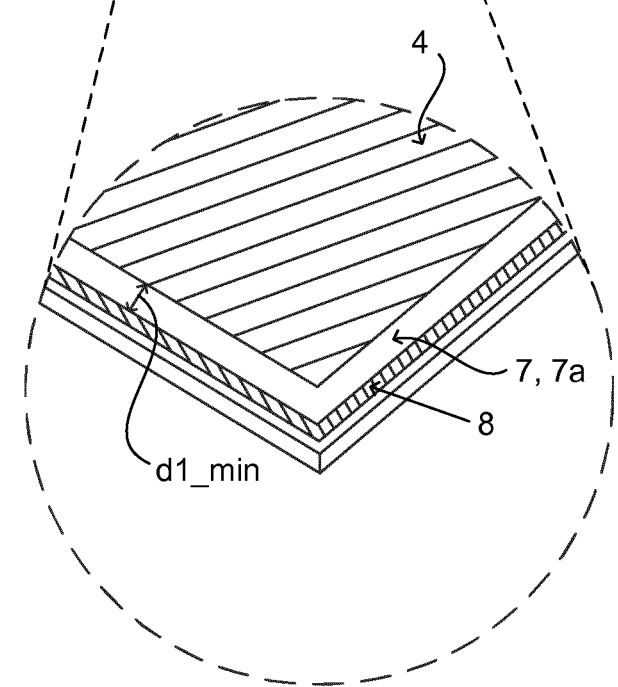
FIG. 16 shows a zoomed in view of a part of the glass pane of FIG. 15.

FIG. 15 shows the glass pane 2 of FIG. 13 and FIG. 14 at an exemplary third step of the method of preparing a glass pane 2 for a VIG unit 1 according to the disclosure. FIG. 16 shows a zoomed in drawing of the circled part of FIG. 15. FIGS. 15-16 shows a side seal material 8 arranged on a part of the edge region 7 of the glass pane 2 such that a distance is ensured between the low emissivity coating 4 and the side seal material 8 which is equal or larger than the minimum separation distance (d1_min) according to the disclosure. In one or more examples, and shown in FIG. 16, the side seal material 8 is a continuous band of sealing material, such as a continuous band of glassy sealing material like low melting point glass. Due to the distance (d1_min) between the side seal material 8 and the low emissivity coating 4, an intermediate edge region 7a is created between the side seal material 8 and the low emissivity coating 4 which is unbonded to either elements, and may be fully exposed to the cavity 11. The intermediate edge region 7a may be free of any species, which may be outgassed to the cavity 11 and change the pressure level. The edge region 7 may merely comprise an exposed surface region of the glass pane 2.

Figure 17:
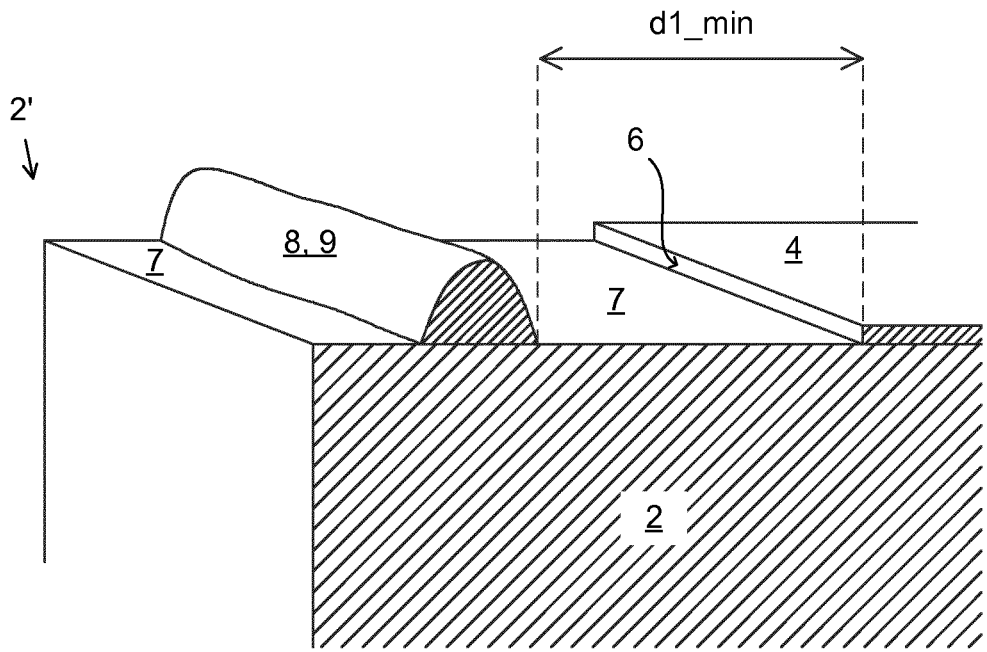
FIG. 17 shows a part of a glass pane according to embodiments of the disclosure comprising a low emissivity coating, an edge region and a side seal material seen in perspective.

FIG. 17 shows cross-sectional view of an example of a part of the glass pane 2 shown in FIG. 15-16 for a VIG unit 1, seen in perspective. In the present example, the side seal material 8 is a low melting point glass material, such as glassy frit material comprising one or more metal oxides as well as at least one solvent and a binder, and arranged on the edge region 7, such that the minimum separation distance (d1_min) is provided between a side surface 6 of the low emissivity coating 4. The side surface 6 may in one or more examples, comprise a plurality of side surfaces 6_n of a plurality of coating layers 5_n making up the low emissivity coating 4.

In one or more examples, the side seal material 8 and the subsequent side seal 9 may be arranged as far towards the edge 2', 3' of the glass panes 2, 3 as possible.

In the present example, as a subsequent step, the glass pane 2 may be paired with a similar glass pane 3 comprising a low emissivity coating 4 and an edge region 7 according to the disclosure, or it may be paired with a glass pane 3 having no low emissivity coating 4 but where the exposed surface may e.g. be the interior major surface 3a of the glass pane 3. In one or more examples, the paired panes 2, 3 are thereafter heated to form the side seal 9 and evacuated to create a low pressure cavity 11. An evacuation opening 13 may be provided into the cavity 11 either through one of the glass panes 2, 3 or the side seal 9, through which the cavity 11 can be evacuated. The evacuation opening 13 is subsequently sealed to create the VIG unit 1.

In one or more examples of the disclosure, a method of manufacturing a VIG unit comprises the following steps of arranging a side seal material being a low melting point glass frit material at a distance of at least the minimum separation distance (d1_min) from the low emissivity coating, according to examples of the disclosure. The method further comprises the step of heating the low melting point glass frit material to soften said material and possibly also burnout and fire the material so as to drive out the solvents and binder, if such are present in the glassy seal material. This may results in a fusion of a glass elements within the glassy seal material. The burnout and firing of the glassy seal material may be provided at a temperature of between 250-290 degrees C., such as between 260-280 degrees Celsius. The temperature may be maintained for a time of at least 5 min, such as for a time between 5-80 min, such as between 15-45 min, or such as between 25-35 min. Additionally, the temperature of the glassy seal material may be raised to a first temperature (T1) of at least 320 degrees Celsius, e.g. between 330-425 degrees Celsius, such as between 340-360 degrees Celsius, so as to bond said glassy seal material to surfaces to be bonded, e.g. the edge region. The first temperature (T1) may be maintained for a time between 20 and 80 min., such as between 30-70 min. or such as between 50-70 min. Thereafter, the glassy seal material may be cooled to a curing temperature (Tcure) of at least 250 degrees, such as 275 degrees Celsius. The cavity may be evacuated when during cooling towards or at the curing temperature (Tcure) of the glassy seal material. The cavity may be evacuated to a pressure below $10^{-5}$ bar, such as below $10^{-6}$ bar or such as below $10^{-7}$ bar.

The present methods of preparing a glass pane 2, 3 for a VIG unit and for manufacturing the resulting VIG unit 1 may comprise any of the arrangements of side seal 9 and low emissivity coating 4 and features of the previous examples relating to the VIG unit 1.

The glass pane 2, 3 may be a tempered glass pane, tempered using a thermal and/or chemical tempering process.

The following examples are included in the present disclosure to illustrate that an interaction between a side seal material, being a low melting point glass material in the present examples, and a low emissivity coating may occur when there is no minimum separation distance provided between the low emissivity coating and the side seal material.

Example 1

Comparable measurements of the emissivity of the low emissivity coating before and after thermal treatment by heating to 400 degrees Celsius for 20 minutes have been undertaken, both with and without low melting point glass being present. Table 1 shows emissivity data obtained from an assembly comprising a low emissivity coating arranged on a glass pane, with no low melting point glass being present. The assembly has been measured before thermal treatment and the emissivity data for this measurement is shown in row 1, from three different positions (A1-A3) on the low emissivity coating and with the associated maximum standard deviation (a) of each measurement. The assembly has also been measured after thermal treatment at the same positions (A1-A3), and the data from these measurements and associated maximum standard deviation (a) are presented in the second row of the table, marked by number 2. By inspection of the data in table 1 it can be seen that emissivity values remains unchanged or undergoes a very small change due to the thermal treatment and the data may show indications of the emissivity of the low emissivity coating being generally unaffected by the thermal treatment of the assembly.

Table 2 shows a similar method of measurement of the emissivity as for the above experiment explained in relation to table 1, the only difference being that the assembly further comprises a low melting point glass material peripherally arranged near the edge of the glass pane for both the measurements before and after the thermal treatment of the assembly, at 400 degrees Celsius for 20 min. The assembly has been measured before thermal treatment and the emissivity data for this measurement is shown in the first row of the table marked by no. 1, at three different positions (B1-B3) on the low emissivity coating near the low melting point glass material and with the associated maximum standard deviation (a) of each measurement. The assembly has also been measured after thermal treatment is the same positions (B1-B3), and the data from these measurements and associated maximum standard deviation (a) are presented in the second row of the table, marked by number 2. By inspection of the data in table 2 it can be seen that emissivity values in all points (B1-B3) are larger after thermal treatment than prior to the thermal treatment, and furthermore that the change in emissivity is more significant than when no low melting point glass was present, as presented in table 1. The average change in emissivity is equal to 0.013.

The above measurements of example 1, indicates that the low melting point glass has an impact on the low emissivity coating and the emissivity level of the coating. It has been observed, that not only does the presence of the low melting point glass degrade the low emissivity coating at the point of attack, but the damage is further seen to propagate inwards toward the centre of the low emissivity coating, i.e. along a direction parallel to the glass surface causing degradation at a distance away from the point of attack.

Example 2

A measure of sheet resistance of a low emissivity coating, measuring the electric loss within the coating, may provide indications of the level of emissivity of the coating, as the emissivity increases with increasing sheet resistance of the coating. In table 3, experimental sheet resistance data obtained by a non-contact and non-destructive measuring method from an assembly having a glass pane 2, 3 arranged with a low emissivity coating 4 and a low melting point glass frit as side sealing material 8 are presented. The low melting point glass 8 is peripherally arranged near the edge of the glass pane 2, 3 providing a substantially frame-like shape.

The data is obtained in five different positions (P1, P2, P3, P4, P5) on the low emissivity coating 4 on the glass pane. Point 1-4 (P1, P2, P3 and P4) are located near the low melting point glass frit, approximately 10 mm from the low melting point glass frit, while point 5 (P5) is located near the centre of the low emissivity coating 4 as shown in FIG. 18. Table 3 shows comparable sheet resistance measurements of the assembly before and after thermal treatment by heating. The row marked by number 1 shows the data obtained at the five positions (P1-P5) before thermal treatment of the assembly. The row marked by number 2 shows the data obtained at the same five positions (P1-P5) after thermal treatment of the assembly has been undertaken, where the thermal treatment in the present example provides heating of the assembly to approximately 400 degrees Celsius for 20 minutes. The third row, marked by delta (Δ), shows the calculated difference in sheet resistance values between before and after thermal treatment. The unit on the sheet resistance values presented in the table is ohms square.

From the values in table 3, it can be seen that in all positions (P1-P5) the sheet resistance is larger before thermal treatment than prior to thermal treatment. Particularly, at the edge positions (P1-P4), the difference in measured sheet resistance before and after thermal treatment is in all points larger than for the centre-position (P5). The average difference observed for the four edge positions (P1-P4) is 0.587 ohms square while the average difference observed at the centre position (P5) is 0.247 ohms square, indicating that the low melting point glass may have an impact on the low emissivity coating. The impact of the low melting point glass on the low emissivity coating has shown to cause a degradation in the integrity of the low emissivity coating, not only at the point of attack, but the damaging effect has also been seen to migrate parallel to the glass pane surface and causing degradation at a distance away from the point of attack.

REFERENCE LIST 1 vacuum insulated glazing unit
2 first glass pane
2a first interior major surface
2b first exterior major surface
2' edge of first glass pane
3 second glass pane
3a second interior major surface
3' edge of second glass pane
4 low emissivity coating
5_n coating layers
5_Ag silver coating layer
6 side surface of low emissivity coating
6_n side surface of coating layer
7 edge region
7a intermediate edge region
8 side seal material
9 side seal
10 barrier material
11 cavity
12 support structure
13 evacuation opening
14 window frame
d1_min minimum separation distance
d2_min minimum buffer distance
W1_max maximum frame overlap width
W2_E width of the edge region
T1 first temperature
Tcure curing temperature

The invention claimed is:

1. A vacuum insulated glazing (VIG) unit comprising:
a first thermally tempered glass pane, having a first interior major surface and a first exterior major surface and a second thermally tempered glass pane having a second interior major surface and second exterior major surface, the thermally tempered glass panes being arranged in parallel with said interior major surfaces facing each other;
a cavity gap size in the range of 0.1 to 0.5 mm measured from the first interior major surface to the second interior major surface,
a low emissivity coating deposited on at least the first interior major surface; and
a side seal deposited on at least the first interior major surface, wherein the side seal is arranged at a minimum separation distance of at least 1.5 mm from said low emissivity coating and wherein the minimum separation distance is at least three times larger than the cavity gap size;
wherein the side seal is made of a glassy seal material.

2. A vacuum insulated glazing unit according to claim 1, wherein the vacuum insulated glazing unit comprises an edge region in proximity to the edge of the first thermally tempered glass pane, defined as where none or a reduced part of the low emissivity coating is present.

3. A vacuum insulated glazing unit according to claim 1, wherein the glassy seal material is a low melting point glass material.

4. A vacuum insulated glazing (VIG) unit according to claim 1, wherein the glassy seal material comprises at least one of:
at least one metal oxide, and
at least one solvent material and at least one binder material.

5. A vacuum insulated glazing unit according to claim 1, wherein the side seal extends from a portion of said edge region of the first thermally tempered glass pane to said second major interior surface of said second thermally tempered glass pane.

6. A vacuum insulated glazing unit according to claim 1, wherein the VIG unit further comprises a low-emissivity coating deposited on the second interior major surface of the second thermally tempered glass pane, and a second edge region in proximity to the edge of the second thermally tempered glass pane, defined as where none or a reduced part of the low emissivity coating is present, and
wherein said side seal is arranged at a minimum separation distance of at least one of:
at least 1 mm from both low emissivity coatings;
between 1-10 mm from said low emissivity coating; and
between 1.5-10 mm from said low emissivity coating.

7. A vacuum insulated glazing unit according to claim 6, wherein said side seal extends from a portion of said edge region of said first thermally tempered glass pane to a portion of said edge region of the second thermally tempered glass pane.

8. A vacuum insulated glazing (VIG) unit according to claim 1, wherein the minimum separation distance varies over a length of the thermally tempered glass panes, wherein the variation in minimum separation distance is at the most 2 mm.

9. A vacuum insulated glazing (VIG) unit according to claim 1, wherein the low emissivity coating comprises at least one of:
a side surface towards the edge region and wherein said side seal is arranged at said minimum distance from said side surface;
a plurality of coating layers, and wherein said edge region comprises a reduced number of said coating layers and being devoid of a silver layer (5_Ag); and
a silver layer (5_Ag) and wherein the side seal is arranged at said minimum separation distance from said silver layer.

* * * * *